United States Patent
Katoh et al.

(10) Patent No.: US 10,131,805 B2
(45) Date of Patent: Nov. 20, 2018

(54) INK, INK STORED CONTAINER, INKJET RECORDING APPARATUS, AND PRINTED MATTER

(71) Applicants: Keita Katoh, Kanagawa (JP); Hiroshi Gotou, Shizuoka (JP); Yuuki Yokohama, Kanagawa (JP); Hiromi Sakaguchi, Kanagawa (JP); Yukiko Takamura, Wakayama (JP)

(72) Inventors: Keita Katoh, Kanagawa (JP); Hiroshi Gotou, Shizuoka (JP); Yuuki Yokohama, Kanagawa (JP); Hiromi Sakaguchi, Kanagawa (JP); Yukiko Takamura, Wakayama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/189,673

(22) Filed: Jun. 22, 2016

(65) Prior Publication Data

US 2016/0376455 A1    Dec. 29, 2016

(30) Foreign Application Priority Data

Jun. 23, 2015 (JP) .................. 2015-125909
Mar. 15, 2016 (JP) .................. 2016-051582

(51) Int. Cl.
| | |
|---|---|
| C09D 11/02 | (2014.01) |
| C09D 11/322 | (2014.01) |
| B41J 2/175 | (2006.01) |
| C09D 11/12 | (2006.01) |
| C09D 11/30 | (2014.01) |
| C09D 11/54 | (2014.01) |
| B41J 2/01 | (2006.01) |
| B41M 5/50 | (2006.01) |
| C09D 11/037 | (2014.01) |

(52) U.S. Cl.
CPC ............... *C09D 11/322* (2013.01); *B41J 2/01* (2013.01); *B41J 2/175* (2013.01); *B41J 2/1752* (2013.01); *B41J 2/17503* (2013.01); *B41J 2/17513* (2013.01); *B41M 5/50* (2013.01); *C09D 11/02* (2013.01); *C09D 11/037* (2013.01); *C09D 11/12* (2013.01); *C09D 11/30* (2013.01); *C09D 11/54* (2013.01)

(58) Field of Classification Search
CPC ....... C09D 11/02; C09D 11/037; C09D 11/12; C09D 11/30; C09D 11/322; C09D 11/54; B41M 5/50; B41J 2/01; B41J 2/17503
See application file for complete search history.

(56) References Cited

U.S. PATENT DOCUMENTS

| | | | |
|---|---|---|---|
| 8,814,340 B2 | 8/2014 | Goto | |
| 8,960,885 B2 | 2/2015 | Katoh et al. | |
| 8,974,895 B2 | 3/2015 | Naruse et al. | |
| 8,980,408 B2 | 3/2015 | Gotou et al. | |
| 8,998,400 B2 | 4/2015 | Harada et al. | |
| 9,033,484 B2 | 5/2015 | Fujii et al. | |
| 9,062,217 B2 | 6/2015 | Gotou et al. | |
| 9,169,416 B2 | 10/2015 | Gotou | |
| 9,217,089 B2 | 12/2015 | Nagai et al. | |
| 9,234,110 B2 | 1/2016 | Katoh et al. | |
| 2002/0196320 A1* | 12/2002 | Hale | B41F 16/02 347/95 |
| 2010/0086692 A1 | 4/2010 | Ohta | |
| 2011/0318543 A1 | 12/2011 | Goto | |
| 2012/0207983 A1* | 8/2012 | Matsuyama | C09D 11/328 428/195.1 |
| 2013/0108841 A1* | 5/2013 | Denda | C09D 11/102 428/195.1 |
| 2013/0115431 A1* | 5/2013 | Aoyama | C09D 11/322 428/195.1 |
| 2014/0022321 A1* | 1/2014 | Komatsu | C09D 11/30 347/100 |
| 2014/0072779 A1 | 3/2014 | Matsuyama et al. | |
| 2014/0092180 A1 | 4/2014 | Matsuyama et al. | |
| 2014/0120331 A1 | 5/2014 | Koizuka et al. | |
| 2014/0141209 A1 | 5/2014 | Koizuka et al. | |
| 2014/0368593 A1* | 12/2014 | Kanasugi | B41J 2/0057 347/103 |
| 2015/0064418 A1 | 3/2015 | Matsuyama et al. | |
| 2015/0064425 A1 | 3/2015 | Matsuyama et al. | |
| 2015/0079358 A1 | 3/2015 | Gotou et al. | |
| 2015/0103116 A1 | 4/2015 | Gotou | |
| 2015/0109382 A1 | 4/2015 | Naruse et al. | |
| 2015/0116421 A1 | 4/2015 | Nonogaki et al. | |
| 2015/0247049 A1 | 9/2015 | Matsuyama et al. | |
| 2015/0252203 A1 | 9/2015 | Matsuyama et al. | |
| 2015/0259555 A1 | 9/2015 | Katoh et al. | |
| 2015/0283828 A1 | 10/2015 | Aoai et al. | |
| 2015/0290928 A1* | 10/2015 | Noguchi | B41J 2/01 347/103 |
| 2015/0291817 A1 | 10/2015 | Katoh et al. | |
| 2015/0307734 A1 | 10/2015 | Nonogaki et al. | |
| 2015/0376425 A1 | 12/2015 | Hakiri et al. | |
| 2016/0017075 A1 | 1/2016 | Harada et al. | |
| 2016/0032037 A1 | 2/2016 | Harada et al. | |

(Continued)

FOREIGN PATENT DOCUMENTS

| | | |
|---|---|---|
| JP | 2010-090266 | 4/2010 |
| JP | 2012-179825 | 9/2012 |

OTHER PUBLICATIONS

U.S. Appl. No. 14/950,175, filed Nov. 24, 2015.

*Primary Examiner* — Betelhem Shewareged
(74) *Attorney, Agent, or Firm* — Oblon, McClelland, Maier & Neustadt, L.L.P.

(57) ABSTRACT

Provided is an ink containing a wax, a plurality of organic solvents, and water, wherein the plurality of organic solvents include a compound having a solubility parameter of 9 or greater but 11 or less and a compound having a saturated vapor pressure at 100° C. of 20 mmHg or greater but 400 mmHg or less.

12 Claims, 4 Drawing Sheets

(56) References Cited

U.S. PATENT DOCUMENTS

2016/0075892 A1 3/2016 Harada et al.
2016/0102162 A1 4/2016 Harada et al.
2016/0130452 A1 5/2016 Katoh et al.

* cited by examiner

INK, INK STORED CONTAINER, INKJET RECORDING APPARATUS, AND PRINTED MATTER

CROSS-REFERENCE TO RELATED APPLICATIONS

The present application claims priority under 35 U.S.C. § 119 to Japanese Patent Application No. 2015-125909, filed Jun. 23, 2015, and Japanese Patent Application No. 2016-051582, filed Mar. 15, 2016. The contents of which are incorporated herein by reference in their entirety.

BACKGROUND OF THE INVENTION

Field of the Invention

The present disclosure relates to inks, ink stored containers, inkjet recording apparatuses, and printed matters.

Description of the Related Art

Compared with other recording methods, inkjet recording methods have simple processes, can be easily accommodated to full-color operations, and can provide high-resolution images even when used on apparatuses having simple configurations. These advantages have made the inkjet recording methods popular and are spreading the inkjet recording methods to personal and office use and commercial printing and industrial printing fields. In commercial printing and industrial printing fields, coated papers such as coat paper and art paper are used as recording media in addition to plain paper, and a high image density, a high image gloss level, and a high fixability are needed over the coated papers.

In the inkjet recording methods, dye inks using a water-soluble dye as a color material have been mainly used. However, pigment inks using a water-insoluble pigment instead of the water-soluble dye have been being developed recently, because the dye inks have disadvantages of being poor in water resistance and light resistance. When an image is formed over coated paper with the pigment inks, a speed at which a water-containing organic solvent contained in the inks permeates the coated paper is slow and the water-containing organic solvent remains over the surface of the coated paper. Therefore, the pigment inks have driability/fixability problems that may lead to omissions of the image due to transfer or scratch.

To solve the problems, for example, there has been proposed an inkjet recording printing method using a water-based ink composition containing a water-insoluble colorant, resin particles, a silicone-based surfactant, an acetylene glycol-based surfactant, a pyrrolidone derivative, 1,2-alkyldiol, a polyvalent alcohol, and water, wherein the resin particles contain resin fixing particles and wax particles (see, e.g., Japanese Unexamined Patent Application Publication No. 2010-090266).

SUMMARY OF THE INVENTION

An ink of the present invention is an ink containing a wax, a plurality of organic solvents, and water. The plurality of organic solvents include a compound having a solubility parameter of 9 or greater but 11 or less and a compound having a saturated vapor pressure at 100° C. of 20 mmHg or greater but 400 mmHg or less.

DESCRIPTION OF THE EMBODIMENTS (Ink)

Figure 1:
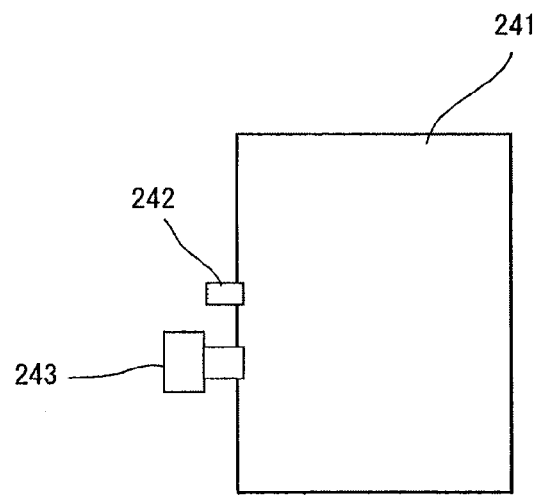
FIG. 1 is a schematic view illustrating an example of an ink bag of an ink cartridge as an ink stored container of the present invention.

An ink of the present invention contains a wax, a plurality of organic solvents, and water, preferably contains a pigment and a surfactant, and further contains other components as needed.

The ink of the present invention is based on a finding that an image formed over coated paper with an existing ink composition containing wax particles cannot obtain a sufficient image density and a sufficient image gloss level.

The present invention has an object to provide an ink excellent in all of image density, an image gloss level, fixability, and transferability when used for image formation over not only plain paper but also coated paper.

The present invention can provide an ink excellent in all of image density, an image gloss level, fixability, and transferability when used for image formation over not only plain paper but also coated paper.

<Organic Solvents>

As the plurality of organic solvents, the ink contains a compound having a solubility parameter of 9 or greater but 11 or less and a compound having a saturated vapor pressure at 100° C. of 20 mmHg or greater but 400 mmHg or less.

In the ink, the compound having a solubility parameter of 9 or greater but 11 or less promotes permeation of an ink solvent into coated paper and spreading of the ink over the paper surface, and the compound having a saturated vapor pressure at 100° C. of 20 mmHg or greater but 400 mmHg or less promotes volatilization of the ink solvent from the coated paper surface to make the wax contained in the ink spread uniformly about a surface layer of the image portion. As a result, when an image is formed over coated paper, a high image density, a high image gloss level, a high driability, and a high fixability are obtained.

Furthermore, the compound having a solubility parameter of 9 or greater but 11 or less and the compound having a saturated vapor pressure at 100° C. of 20 mmHg or greater but 400 mmHg or less have a high compatibility and do not inhibit each other's function when the compounds are mixed with each other.

The solubility parameter (SP value) is widely used as an indicator of affinity and solubility of materials such as solvents, resins, and pigments that are used as dissolved or dispersed in water or a solvent.

Various methods are propounded as a method for obtaining the SP value, including a method for measuring a SP value through an experiment, a method for calculating a SP value through measurement of a physical property such as immersion heat, and a method for calculating a SP value from a molecular structure. In the present invention, a method for calculating a SP value from a molecular structure propounded by Fedors is used. This method is effective in that a SP value can be calculated so long as a molecular structure can be identified and in that a calculated SP value has a small difference from a value measured through an experiment.

According to the Fedors method, a SP value can be calculated by assigning an evaporation energy Δei and a molar volume ΔVi of an atom or a group of atoms at 25° C. into a mathematical formula 1 below. In the present invention, a SP value at 25° C. is used, and temperature conversion, etc. are not performed.

Data described in Imoto, Minoru. *SECCHAKU NO KISO RIRON*, Kobunshi Kankokai, chapter 5 can be used as the data of the evaporation energy Δei and molar volume ΔVi of each group of atoms in the calculation method described above.

Fedors, R. F. *Polym. Eng. Sci.* 14, 147, 1974 can be referred to for any matters, data of which are not presented in *SECCHAKU NO KISO RIRON* mentioned above.

$$SP \text{ value} = \left(\frac{\Delta E}{V}\right)^{1/2} = \left(\frac{\sum_i \Delta ei}{\sum_i \Delta Vi}\right)^{1/2} \quad \langle\text{Mathematical formula 1}\rangle$$

In the mathematical formula 1, ΔE represents an evaporation energy, V represents a molar volume, Δei represents an evaporation energy of an atom or a group of atoms, and ΔVi represents a molar volume of an atom or a group of atoms.

Examples of the compound having a SP value of 9 or greater but 11 or less include N,N-dimethyl-β-butoxypropionamide (SP value: 9.8), N,N-dimethyl-β-ethoxypropionamide (SP value: 9.8), and 3-ethyl-3-hydroxymethyloxetane (SP value: 10.7). One of these compounds may be used alone or two or more of these compounds may be used in combination.

Structural formulae of the N,N-dimethyl-β-butoxypropionamide, N,N-dimethyl-β-ethoxypropionamide, and 3-ethyl-3-hydroxymethyloxetane are presented below.

N,N-dimethyl-β-butoxypropionamide

<Structural formula (1)>

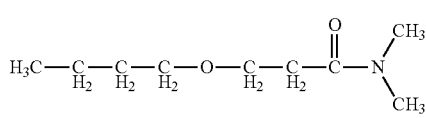

N,N-dimethyl-β-ethoxypropionamide

<Structural formula (2)>

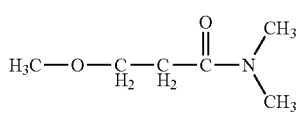

3-ethyl-3-hydroxymethyloxetane

<Structural formula (3)>

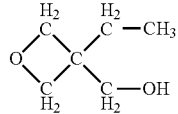

A content of the compound having a solubility parameter of 9 or greater but 11 or less is preferably 1% by mass or greater but 60% by mass or less and more preferably 5% by mass or greater but 50% by mass or less of a total amount of the ink.

In the preferable value range, image formation over coated paper results in favorable results in all of image density, an image gloss level, fixability, and transferability.

Examples of the compound having a saturated vapor pressure at 100° C. of 20 mmHg or greater but 400 mmHg or less include propylene glycol monopropylether (105 mmHg), propylene glycol monomethylether (380 mmHg), 3-methoxybutanol (92 mmHg), ethylene glycol monobutylether (68 mmHg), and 1,2-propanediol (23 mmHg). One of these compounds may be used alone or two or more of these compounds may be used in combination.

The saturated vapor pressure of the compound at 100° C. can be measured according to, for example, a DSC method.

A content of the compound having a saturated vapor pressure at 100° C. of 20 mmHg or greater but 400 mmHg or less is preferably 1% by mass or greater but 50% by mass or less and more preferably 5% by mass or greater but 40% by mass or less of the total amount of the ink.

In the preferable value range, image formation over coated paper results in favorable results in all of image density, an image gloss level, fixability, and transferability.

A ratio by mass (A/B) of a content A (% by mass) of the compound having a solubility parameter of 9 or greater but 11 or less to a content B (% by mass) of the compound having a saturated vapor pressure at 100° C. of 20 mmHg or greater but 400 mmHg or less is preferably 0.1 or greater but 10 or less and more preferably 0.5 or greater but 5 or less.

When the ratio by mass (A/B) is in the preferable value range, image formation over coated paper results in favorable results in an image gloss level and fixability.

As needed, the ink may use any other organic solvent in combination with the compound having a solubility parameter of 9 or greater but 11 or less and the compound having a saturated vapor pressure at 100° C. of 20 mmHg or greater but 400 mmHg or less.

The any other organic solvent is not particularly limited and may be appropriately selected depending on the intended purpose. Examples of the any other organic solvent include: polyvalent alcohols such as ethylene glycol, diethylene glycol, triethylene glycol, tetraethylene glycol, polyethylene glycol, dipropylene glycol, tripropylene glycol, polypropylene glycol, 1,3-butanediol, 3-methyl-1,3-butanediol, trimethylolethane, trimethylolpropane, 1,5-pentanediol, 1,6-hexanediol, hexylene glycol, glycerin, 1,2,3-butanetriol, 1,2,4-butanetriol, 1,2,6-hexanetriol, isopropylidene glycerol, and 3-methyl-1,3,5-pentanetriol; polyvalent alcohol alkylethers such as ethylene glycol monomethylether, ethylene glycol monobutylether, diethylene glycol monomethylether, diethylene glycol monoethylether, diethylene glycol monobutylether, tetraethylene glycol monomethylether, and propylene glycol monoethylether;

polyvalent alcohol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethylimidazolidinone, s-caprolactam, and γ-butyrolactone; amides such as form amide, N-methylformamide, N,N-dimethylformamide, 3-methoxy-N,N-dimethylpropionamide, and 3-butoxy-N,N-dimethylpropionamide; amines such as monoethanolamine, diethanolamine, triethanolamine, monoethylamine, diethylamine, and triethylamine; sulfur-containing compounds such as dimethyl sulfoxide, sulfolane, and thiodiethanol; aliphatic diols such as 2-ethyl-2-methyl-1,3-propanediol, 2,2-diethyl-1,3-propanediol, 2-methyl-2-propyl-1,3-propanediol, 3,3-dimethyl-1,2-butanediol, 2,4-dimethyl-2,4-pentanediol, 2,5-dimethyl-2,5-hexanediol, and 5-hexene-1,2-diol; alkyl- and aryl-ethers of polyvalent alcohols such as diethylene glycol monobutylether, propylene glycol monobutylether, ethylene glycol monophenylether, diethylene glycol monophenylether, ethylene glycol monoallylether, and tetraethylene glycol chlorophenylether; lower alcohols such as ethanol; 3-ethyl-3-hydroxymethyloxetane; propylene carbonate; and ethylene carbonate. One of these organic solvents may be used alone or two or more of these organic solvents may be used in combination.

A total content of the organic solvents is not particularly limited and may be appropriately selected depending on the intended purpose. However, the total content is preferably 10% by mass or greater but 70% by mass or less and more preferably 20% by mass or greater but 60% by mass or less of the total amount of the ink. When the content is 10% by mass or greater but 70% by mass or less, image formation over coated paper results in favorable results in all of image density, an image gloss level, fixability, and transferability.

<Wax>

The wax may be any of a water-soluble wax and a water-dispersible wax. Examples of the water-soluble wax include waxes containing a hydrophilic group such as a hydroxyl group, a carboxyl group, an ethylene oxide group, and an amine group. The water-dispersible wax can be mainly used in a form of a wax emulsion.

The wax is not particularly limited and may be appropriately selected depending on the intended purpose. Examples of the wax include: plant and animal waxes such as carnauba waxes, candelilla waxes, beeswaxes, rice waxes, and lanolin; petroleum-based waxes such as paraffin waxes, microcrystalline waxes, polyethylene waxes, polypropylene waxes, polyethylene oxide waxes, and petrolatum; mineral waxes such as montan waxes and ozokerite; synthetic waxes such as carbon waxes, Hoechst waxes, polyethylene waxes, and stearic acid amides; and natural or synthetic wax emulsions and wax preparations such as α-olefin/maleic anhydride copolymers or latices, colloidal solutions, and suspensions of the natural or synthetic wax emulsions and wax preparations. One of these waxes may be used alone or two or more of these waxes may be used in combination. Among these waxes, polyethylene waxes are preferable in terms of a favorable solubility and a favorable dispersibility in a water-soluble solvent and fixability over coated paper.

The wax may be a commercially available product. Examples of the commercially available product include CELLOZOLE 524 (a carnauba wax with a melting point of 83° C. and a volume average particle diameter of 200 nm available from Chukyo Yushi Co., Ltd.), HYTEC E-6500 (a polyethylene wax with a melting point of 140° C. and a volume average particle diameter of 60 nm available from Toho Chemical Industry Co., Ltd.), HYTEC E-8237 (a polyethylene wax with a melting point of 106° C. and a volume average particle diameter of 80 nm available from Toho Chemical Industry Co., Ltd.), HYTEC P-9018 (a polypropylene wax with a melting point of 156° C. and a volume average particle diameter of 60 nm available from Toho Chemical Industry Co., Ltd.), NOPCOAT PEM-177 (a polyolefin wax with a melting point of 105° C. and a volume average particle diameter of 10 nm available from San Nopco Limited), AQUACER 498 (a paraffin-based wax with a melting point of 58° C. available from Byk-Chemie Japan KK), AQUACER 535 (a mixed wax with a melting point of 95° C. available from Byk-Chemie Japan KK), AQUACER 531 (a polyethylene wax with a melting point of 130° C. and a volume average particle diameter of 123 nm available from Byk-Chemie Japan KK), AQUACER 537 (a paraffin wax available from Byk-Chemie Japan KK), and AQUACER 515 (a polyethylene wax with a melting point of 135° C. and a volume average particle diameter of 33 nm available from Byk-Chemie Japan KK).

A melting point of the wax is preferably 70° C. or higher but 170° C. or lower and more preferably 100° C. or higher but 140° C. or lower. When the melting point is 70° C. or higher, an image does not become sticky and images stacked one over another do not have an image transfer. When the melting point is 170° C. or lower, the wax melts by frictional heat when an image is scratched, to provide slippage and hence, a favorable image fixability.

A volume average particle diameter of the wax is preferably 200 nm or less and more preferably 20 nm or greater but 150 nm or less. When the volume average particle diameter is 200 nm or less, the wax does not block a nozzle or a filter in a head and provides a favorable ink dischargeability.

A content of the wax is preferably 0.01% by mass or greater but 10% by mass or less and more preferably 0.5% by mass or greater but 2% by mass or less of the total amount of the ink. When the content is 0.01% by mass or greater, slippage can be imparted to a surface of an image printed, and image fixability can be maintained high. When the content is 10% by mass or less, a gloss level of a printed image can be improved. Furthermore, because the wax can dissolve or disperse in the organic solvents in the ink, the wax does not deposit and adhere to a head, and makes it possible for ink droplets to be discharged favorably.

The content of the wax in the ink is preferably 0.02 parts by mass or greater but 0.34 parts by mass or less when the content of the compound having a solubility parameter of 9 or greater but 11 or less in the ink is seen to be 1 part by mass. When the content is 0.02 parts by mass or greater, fixability over coated paper is further improved. When the content is 0.34 parts by mass or less, image density is improved.

The content of the wax in the ink is preferably 0.0025 parts by mass or greater but 1 part by mass or less when the content of the compound having a saturated vapor pressure at 100° C. of 20 mmHg or greater but 400 mmHg or less in the ink is seen to be 1 part by mass. When the content is 0.0025 parts by mass or greater, fixability over coated paper is further improved. When the content is 1 part by mass or less, a gloss level is improved.

<Pigment>

The pigment is contained as a color material (colorant) of the ink.

The ink of the present invention encompasses a clear ink free of a pigment. The clear ink encompasses a clear ink to be used instead of an ink containing a pigment and a clear ink to be delivered after an ink containing a pigment is discharged, onto the discharged ink image.

The pigment is not particularly limited and may be appropriately selected depending on the intended purpose. However, a pigment containing at least one kind of a hydrophilic group over a surface to exhibit at least one of water dispersibility and water solubility is preferable. When a pigment containing at least one kind of a hydrophilic group over a surface is used, image density over coated paper is improved.

The hydrophilic group is not particularly limited and may be appropriately selected depending on the intended purpose. However, an anionic hydrophilic group is preferable. The anionic hydrophilic group is not particularly limited and may be appropriately selected depending on the intended purpose. Examples of the anionic hydrophilic group include —COOX, —SO$_3$X, —PO$_3$HX, —PO$_3$X$_2$, —CONX$_2$, —SO$_3$NX$_2$, —NH—C$_6$H$_4$—COOX, —NH—C$_6$H$_4$—SO$_3$X, —NH—C$_6$H$_4$—PO$_3$HX, —NH—C$_6$H$_4$—PO$_3$X$_2$, —NH—C$_6$H$_4$—CONX$_2$, —NH—C$_6$H$_4$—SO$_3$NX$_2$, —OPO$_3$HX, and —OPO$_3$X$_2$ (where X represents a hydrogen atom, an alkali metal, a quaternary ammonium, or an organic ammonium).

Examples of the pigment include (1) pigments dispersed with a dispersant containing at least one kind of a hydrophilic group, (2) pigments coated with a resin containing at least one kind of a hydrophilic group, and (3) pigments bound with at least one kind of a hydrophilic group, bound with a group of atoms including at least one kind of a hydrophilic group, or bound with a resin containing at least one kind of a hydrophilic group.

<<Pigments of (1)>>

The pigments of (1) are generally called surfactant-dispersed pigments or resin-dispersed pigments, and are dispersed by the dispersant mediating between the pigment and water at the interface.

The dispersant may be any of a surfactant-type dispersant containing a hydrophilic group and a resin dispersant containing a hydrophilic group.

A content of the dispersant in the ink when the dispersant is used is not particularly limited and may be appropriately selected depending on the intended purpose. Furthermore, two or more dispersants may be used in combination in a range in which the effect is not spoiled.

Dispersion of the pigment with the dispersant can be performed with, for example, a sand mill, a homogenizer, a ball mill, a bead mill, a paint shaker, and an ultrasonic disperser.

—Surfactant-Type Dispersant—

Examples of the surfactant-type dispersant include anionic surfactants, cationic surfactants, amphoteric surfactants, and nonionic surfactants.

Examples of the anionic surfactants include alkylsulfocarboxylic acid salts, α-olefinsulfonic acid salts, polyoxyethylenealkylether acetic acid salts, N-acyl amino acid and salts of the N-acyl amino acid, N-acyl methyltaurate salts, polyoxyalkylether sulfuric acid salts, polyoxyethylenealkylether phosphoric acid salts, rosin acid soaps, castor oil sulfuric acid ester salts, lauryl alcohol sulfuric acid ester salts, alkylphenol-based phosphoric acid esters, naphthalene sulfonic acid salt-formalin condensates, alkyl-based phosphoric acid esters, alkylallylsulfonic acid salts, diethylsulfosuccinic acid salts, diethylhexylsulfosuccinic acid salts, and dioctylsulfosuccinic acid salts.

Examples of the cationic surfactants include 2-vinylpyridine derivatives and poly-4-vinylpyridine derivatives.

Examples of the amphoteric surfactants include lauryldimethyl amino acetic acid betaine, 2-alkyl-N-carboxymethyl-N-hydroxyethylimidazolinium betaines, palm oil fatty acid amide propyldimethylamino acetic acid betaine, polyoctyl polyaminoethyl glycine, and imidazoline derivatives.

Examples of the nonionic surfactants include: ether-based surfactants such as polyoxyethylene nonylphenylethers, polyoxyethylene octylphenylethers, polyoxyethylene dodecylphenylethers, polyoxyethylene laurylethers, polyoxyethylene oleylethers, polyoxyethylene alkylethers, polyoxyethylene-β-naphthylethers, and polyoxyallylalkyl ethers; ester-based surfactants such as polyoxyethylene oleic acids, polyoxyethylene oleic acid esters, polyoxyethylene distearic acid esters, sorbitan laurate, sorbitan monostearate, sorbitan monooleate, sorbitan sesquioleate, polyoxyethylene monooleates, and polyoxyethylene stearates; and acetylene glycol-based surfactants such as 2,4,7,9-tetramethyl-5-desine-4,7-diol, 3,6-dimethyl-4-octane-3,6-diol, and 3,5-dimethyl-1-hexyn-3-ol.

—Resin Dispersant—

Examples of the resin dispersant include homopolymers, copolymers, terpolymers, and polymers containing many different optional numbers of repeating units.

Examples of the polymers include random polymers, branched polymers, alternating polymers, graft polymers, block polymers, star polymers, and comb polymers. One of these polymers may be used alone or two or more of these polymers may be used in combination.

Examples of the resin dispersant include homopolymers or copolymers of monomers, a vinyl monomer, an acrylamide monomer, a methacrylamide monomer, acrylate ester monomers, methacrylate monomer ester monomers, vinyl ester monomers, vinylether monomers, and a styrene monomer that contain a hydrophilic functional group (hydrophilic group) such as a carboxyl group, a sulfonic acid group, a phosphoric acid group, and a phosphonic acid group. Copolymers obtained by polymerizing the monomers presented above with another ethylenic unsaturated monomer may also be used.

Examples of the ethylenic unsaturated monomer include styrene, α-methylstyrene, dimethylstyrene, tert-butylstyrene, chlorostyrene, benzyl (meth)acrylate, phenyl (meth)acrylate, phenylethyl (meth)acrylate, phenylpropyl (meth)acrylate, phenoxyethyl (meth)acrylate, methyl (meth)acrylate, ethyl (meth)acrylate, n-propyl (meth)acrylate, isopropyl (meth)acrylate, n-butyl (meth)acrylate, iso-butyl (meth)acrylate, tert-butyl (meth)acrylate, 2-ethylhexyl (meth)acrylate, n-octyl (meth)acrylate, dodecyl (meth)acrylate, octadecyl (meth)acrylate, cyclohexyl (meth)acrylate, isobornyl (meth)acrylate, 2-hydroxyethyl (meth)acrylate, 2-hydroxypropyl (meth)acrylate, methoxypolyethylene glycol mono(meth)acrylate, and methoxypoly(oxyethyleneoxypropylene)glycol mono(meth)acrylate. One of these ethylenic unsaturated monomers may be used alone or two or more of these ethylenic unsaturated monomers may be used in combination.

Polymers obtained by polymerizing the monomers containing a hydrophilic group with a monomer containing a hydrophobic group may also be used. Examples of the monomer containing a hydrophobic group include 1-vinylnaphthalene, 2-vinylnaphthalene, benzyl acrylate, benzyl methacrylate, phenethyl acrylate, phenethyl methacrylate, cyclohexyl acrylate, cyclohexyl methacrylate, dodecyl acrylate, dodecyl methacrylate, hexadecanyl acrylate, hexadecanyl methacrylate, octadecanyl acrylate, octadecanyl methacrylate, icosanyl acrylate, icosanyl methacrylate, docosanyl acrylate, and docosanyl methacrylate. One of these monomers containing a hydrophobic group may be used alone or two or more of these monomers containing a hydrophobic group may be used in combination.

A method for synthesizing the resin dispersant is not particularly limited and may be appropriately selected depending on the intended purpose. Examples of the method include solution polymerization, suspension polymerization, bulk polymerization, and emulsion polymerization. Among these methods, a method using a radical polymerization initiator is preferable because it is easy to adjust a polymerization operation and a molecular weight with this method.

The radical polymerization initiator is not particularly limited and may be appropriately selected depending on the intended purpose. Examples of the radical polymerization initiator include peroxyketals, hydroperoxides, dialkyl peroxides, diacyl peroxides, peroxy dicarbonates, peroxy esters, cyano-based azobisisobutyronitrile, cyano-based azobis(2-methylbutyronitrile), cyano-based azobis(2,2'-isovaleronitrile), and non-cyano-based dimethyl-2,2'-azobisisobutyrate. One of these radical polymerization initiators may be used alone or two or more of these radical polymerization initiators may be used in combination. Among these radical polymerization initiators, organic peroxides and azo-compounds are preferable and azo-compounds are more preferable because molecular weight control is easy and a decomposition temperature is low.

A content of the polymerization initiator is preferably in a range of from 1% by mass through 10% by mass of a total mass of polymerizable monomers.

It is preferable that a part or a whole of hydrophilic groups of the resin dispersant be ionized through neutralization with a base.

Examples of the base used for the neutralization include: alkali metal hydroxides such as lithium hydroxide, sodium hydroxide, and potassium hydroxides; ammonium; organic amines such as mono, di, or tri methylamine, mono, di, or tri ethylamine, monoethanolamine, diethanolamine, triethanolamine, methylethanolamine, methyldiethanolamine, dimethylethanolamine, choline, aminoethanepropanediol, monopropanolamine, dipropanolamine, tripropanolamine, isopropanolamine, trishydroxymethylaminomethane, aminoethylpropanediol, tetramethylammonium, tetraethylammonium, and tetrabutylammonium; and organic amines such as cyclic amines such as monopholine, N-methylmonopholine, N-methyl-2 pyrrolidone, and 2-pyrrolidone. One of these bases may be used alone or two or more of these bases may be used in combination.

The resin dispersant may be a commercially available product. The commercially available product is easily available from, for example, Johnson Polymer Ltd., Nagase ChemteX Corporation, Toagosei Co., Ltd., Mitsubishi Rayon Co, Ltd., Sumitomo Seika Chemicals Co., Ltd., JSR Corporation, Showa Kobunshi Co., Ltd., Arakawa Chemical Industries, Ltd., Nippon Shokubai Co., Ltd., Nippon Synthetic Chemical Industry Co., Ltd., and Kuraray Co., Ltd.

<<Pigments of (2)>>

The pigments of (2) are generally called capsule pigments and are coated with a hydrophilic, water-insoluble resin to be made dispersible in water through hydrophilization of the resin layer over the surface of the pigment.

The capsule pigments are coated with and micro-encapsulated in a resin containing at least one kind of a hydrophilic group to be made stably dispersible in a solvent without a dispersant.

It is preferable that a part or a whole of hydrophilic groups of the resin of the capsule pigments be ionized through neutralization with a base, like the hydrophilic groups of the resin dispersant.

Examples of the resin to coat the pigment include polyamides, polyurethanes, polyesters, polyureas, epoxy resins, polycarbonates, urea resins, melamine resins, phenol resins, polysaccharides, gelatin, gum arabic, dextran, casein, proteins, natural rubbers, carboxypolymethylenes, polyvinyl alcohols, polyvinyl pyrrolidones, polyvinyl acetates, polyvinyl chlorides, polyvinylidene chlorides, cellulose, ethylcellulose, methylcellulose, nitrocellulose, hydroxyethylcellulose, cellulose acetates, polyethylenes, polystyrenes, polymers or copolymers of (meth)acrylic acid, polymers or copolymers of (meth)acrylic acid esters, (meth)acrylic acid-(meth)acrylic acid ester copolymers, styrene-(meth)acrylic acid copolymers, styrene-maleic acid copolymers, sodium alginate, fatty acids, paraffins, beeswaxes, privet waxes, hydrogenated beef tallows, carnauba waxes, and albumin. One of these resins may be used alone or two or more of these resins may be used in combination.

A nonionic polymer is preferable as the resin to coat the pigment. Examples of the nonionic polymer include polyvinyl alcohols, polyethylene glycol monomethacrylates, polypropylene glycol monomethacrylates, methoxypolyethylene glycol monomethacrylates, copolymers of these nonionic polymers, and polymers obtained by cationic ring-opening polymerization of 2-oxazoline. Among these nonionic polymers, completely saponified products of polyvinyl alcohols are preferable because completely saponified products of polyvinyl alcohols have a poor water solubility, and are easily soluble in hot water but sparingly soluble in cold water.

A method for coating a water-insoluble pigment with a polymer for micro-encapsulation is not particularly limited, and all known methods can be used. Examples of the method include chemical methods, physicochemical methods, and mechanical methods. Specific examples of the method include an interfacial polymerization method, an in-situ polymerization method, an in-liquid curing coating method, a coacervation (phase separation) method, an in-liquid drying method, a fusion distribution cooling method, an aerial suspension coating method, a spray drying method, an acid deposition method, and a phase-transfer emulsification method.

Here, micro-encapsulation mentioned above will be described.

The interfacial polymerization method is a method for dissolving two kinds of monomers or two kinds of reactants in a dispersed phase and a continuous phase separately and reacting both of the substances with each other at the interface between the substances to form a wall film.

The in-situ polymerization method is a method for supplying a liquid or gaseous monomer and a catalyst or two kinds of reactive substances either from a continuous phase or from nuclear particles to cause a reaction to form a wall film.

The in-liquid curing coating method is a method for insolubilizing droplets of a polymer solution containing core substance particles in a liquid using, for example, a curing agent to form a wall film.

The coacervation (phase separation) method is a method for separating a polymer dispersion liquid in which core substance particles are dispersed into a coacervate (dense phase) having a high polymer concentration and a dilute phase to form a wall film.

The in-liquid drying method is a method for preparing a dispersion liquid in which a core substance is dispersed in a solution of a wall film substance, pouring the dispersion liquid into a liquid with which a continuous phase of the dispersion liquid is immiscible to make a composite emulsion, and gradually removing the solvent in which the wall film substance is dissolved to form a wall film.

The fusion distribution cooling method is a method using a wall film substance that melts into a liquid state when heated and solidifies at normal temperature, to heat and liquefy the wall film substance, disperse core substance particles in the liquefied wall film substance, make the resultant into minute particles, and cool the minute particles to form a wall film.

The aerial suspension coating method is a method for suspending powder-state core substance particles in air with a fluidized bed, and while floating the core substance particles in an air stream, spraying and mixing a coating liquid of a wall film substance to form a wall film.

The spray drying method is a method for spraying an undiluted encapsulating liquid to expose the liquid to hot air, evaporate and dry a volatile content, and form a wall film.

The acid deposition method is a method for neutralizing at least a part of anionic groups of an anionic group-containing organic polymer compound with a basic compound to impart water solubility to the organic polymer compound, kneading the organic polymer compound together with a color material in an aqueous medium, adjusting the resultant to a neutral level or an acidic level with an acidic compound to deposit the organic compound and make the organic compound adhere to the color material, and neutralizing and dispersing the resultant.

The phase-transfer emulsification method is a method for preparing a mixture of an anionic organic polymer having water dispersibility and a color material as an organic solvent phase and feeding water to the organic solvent phase or feeding the organic solvent phase to water.

It is preferable to select a suitable organic polymer depending on the micro-encapsulation methods.

For example, polyesters, polyamides, polyurethanes, polyvinyl pyrrolidones, and epoxy resins are suitable for the interfacial polymerization method. For example, polymers or copolymers of (meth)acrylic acid esters, (meth)acrylic acid-(meth)acrylic acid ester copolymers, styrene-(meth)acrylic acid copolymers, polyvinyl chlorides, polyvinylidene chlorides, and polyamides are suitable for the in-situ polymerization method. For example, sodium alginate, polyvinyl alcohols, gelatin, albumin, and epoxy resins are suitable for the in-liquid curing method. For example, gelatin, celluloses, and casein are suitable for the coacervation method. Needless to say, all known encapsulation methods other than the methods described above can be used in order to obtain a minute, uniform micro-encapsulated pigment.

When the phase-transfer emulsification method or the acid deposition method is selected as the micro-encapsulation method, the polymer used to constitute a wall film substance of the microcapsule is an anionic polymer.

The phase-transfer emulsification method is a method for preparing a composite product or a composite body of an anionic polymer having self-dispersibility or solubility in water and a carbon black or a mixture of a carbon black, a curing agent, and an anionic polymer as an organic solvent phase, feeding water to the organic solvent phase or feeding the organic solvent phase to water, and making the materials form a microcapsule while making the materials undergo self-dispersion (phase-transfer emulsification).

The carbon black encompasses self-dispersible carbon blacks. In the phase-transfer emulsification method, no troubles occur during the production even if a vehicle for the ink or an additive is mixed in the organic solvent phase. Particularly, it is rather preferable to mix the organic solvents of the ink, because this makes it possible to produce a dispersion liquid of the ink directly.

On the other hand, the acid deposition method is a method for micro-encapsulating a water-containing cake through neutralization of a part or a whole of anionic groups of the water-containing cake with a basic compound, where the water-containing cake is obtained by a producing method including a step of neutralizing a part or a whole of anionic groups of an anionic polymer with a basic compound and kneading the anionic polymer together with a color material such as a carbon black in an aqueous medium and a step of adjusting pH of the resultant to a neutral level or an acidic level with an acidic compound to deposit the anionic polymer and make the anionic polymer adhere to the pigment. Through this process, an aqueous dispersion liquid containing a minute, pigment-rich anionic micro-encapsulated pigment can be produced.

Examples of a solvent used for the micro-encapsulation include alkylalcohols such as methanol, ethanol, propanol, and butanol; aromatic hydrocarbons such as benzol, toluol, and xylol; esters such as methyl acetate, ethyl acetate, and butyl acetate; chlorinated hydrocarbons such as chloroform and ethylene dichloride; ketones such as acetone and methyl isobutyl ketone; ethers such as tetrahydrofuran and dioxane; and cellosolves such as methylcellosolve and butylcellosolve.

The intended ink can be obtained by once separating the microcapsule prepared by the methods described above from the solvent presented above by, for example, centrifugation or filtration and stirring the separated microcapsule with water and a solvent as needed for re-dispersion.

<<Pigments of (3)>>

The pigments of (3) are generally called self-dispersible pigments, and are typically made of, for example, a carbon black that is hydrophilized through a surface oxidation treatment such that the pigment alone is dispersed in water.

The self-dispersible pigments fall under any of the followings.

(i) Pigments that are surface-reformed to be directly bound with at least one kind of a hydrophilic group (ii) Pigments that are surface-reformed to be bound with a group of atoms including at least one kind of a hydrophilic group (iii) Pigments that are surface-reformed to be bound with a resin containing at least one kind of a hydrophilic group Examples of the group of atoms including at least one kind of a hydrophilic group include groups having a general formula 1 below and a general formula 2 below, or partial esters or salts of the groups.

Examples of the group of atoms include groups having a general formula 3 below and a general formula 4 below or partial esters or salts of the general formula 3 and the general formula 4.

Examples of the group of atoms include groups having a general formula 5 below and a general formula 6 below or partial esters or salts of the general formula 5 and the general formula 6.

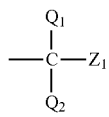

<General formula 1>

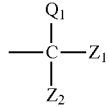

<General formula 2>

In the general formula 1 and the general formula 2, $Q_1$ and $Q_2$ represent a hydrogen atom, R, OR, SR, or $NR_2$ (where R represents any one of a hydrogen atom, a saturated or unsaturated, branched or unbranched alkyl group containing 1 through 18 carbon atoms, substituted or unsubstituted, branched or unbranched acyl group containing 1 through 18 carbon atoms, an aralkyl group, an alkaryl group, and an aryl group, and when there are two or more R's, the R's may be the same or different).

It is preferable that $Q_1$ and $Q_2$ represent a hydrogen atom, R, OR, SR, or $NR_2$ (where R represents a hydrogen atom, an alkyl group containing 1 through 6 carbon atoms, or an aryl group). It is more preferable that $Q_1$ and $Q_2$ represent a hydrogen atom, OH, or $NH_2$.

$Z_1$ and $Z_2$ represent a hydrophilic group. Examples of the hydrophilic group include —COOX, —$SO_3$X, —$PO_3$HX, —$POX_2$, —$CONX_2$, —$SO_3NX_2$, —NH—$C_6H_4$—COOX, —NH—$C_6H_4$—$SO_3$X, —NH—$C_6H_4$—$PO_3$HX, —NH—$C_6H_4$—$PO_3X_2$, —NH—$C_6H_4$—$CONX_2$, —NH—$C_6H_4$—$SO_3NX_2$, —$OPO_3$HX, and —$OPO_3X_2$ (where X represents a hydrogen atom, an alkali metal, a quaternary ammonium, or an organic ammonium).

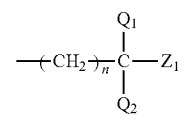

<General formula 3>

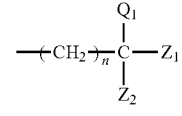

<General formula 4>

In the general formula 3 and the general formula 4, $Q_1$ and $Q_2$ and $Z_1$ and $Z_2$ represent the same as described above, and n is preferably in a range of from 0 through 9, more preferably in a range of from 1 through 9, yet more preferably in a range of from 1 through 3, and particularly preferably 0 or 1.

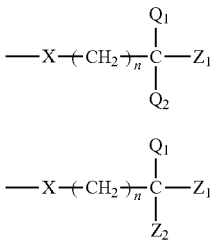

<General formula 5>

<General formula 6>

In the general formula 5 and the general formula 6, $Q_1$ and $Q_2$, $Z_1$ and $Z_2$, and n represent the same as described above.

X represents an arylene group, a heteroarylene group, an alkylene group, a vinylidene group, an alkarylene group, an aralkylene group, a cyclic group, or a heterocyclic group.

Examples of the arylene group include a phenylene group, a naphthalene group, and a biphenylene group (may have an optional group, for example, one or more alkyl groups or aryl groups substituted).

Examples of the alkylene group include substituted or unsubstituted alkylene groups, which are branched or unbranched and may have one or more groups (for example, aromatic groups) substituted. Examples of such alkylene groups include alkylene groups containing 1 through 12 carbon atoms, such as methylene, ethylene, propylene, and butylene groups.

Among the self-dispersible pigments, particularly, a pigment reformed with at least one of a geminal bisphosphonic acid group and a geminal bisphosphonic acid base imparts an excellent redispersibility after drying to an ink. Therefore, even after a long term of suspension of a printing operation, the ink has not clogged inkjet head nozzles even if a water content of the ink about the nozzles has evaporated, and a favorable printing operation can be performed easily with a simple cleaning operation. Furthermore, the ink has a high temporal storage stability and is suppressed from viscosity increase upon evaporation of the water content. Therefore, the ink is extraordinarily excellent in ink adherence in a head maintaining device and in discharging reliability.

Specific examples of the phosphonic acid group or the phosphonic acid base include a structural formula (i) below to a structural formula (iv) below.

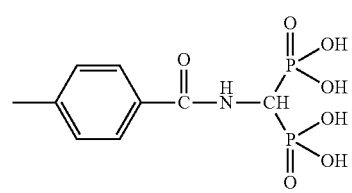

Structural formula (i)

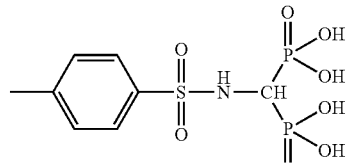

Structural formula (ii)

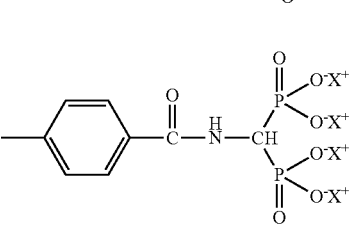

Structural formula (iii)

In the structural formula (iii), $X^+$ represents any one of $Li^+$, $K^+$, $Na^+$, $NH_4^+$, $N(CH_3)_4^+$, $N(C_2H_5)_4^+$, $N(C_3H)_4^+$, and $N(C_4H_9)_4^+$.

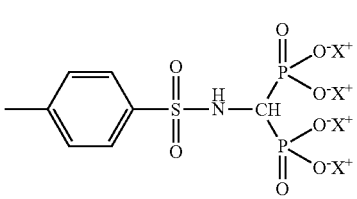

Structural formula (iv)

In the structural formula (iv), $X^+$ represents any one of $Li^+$, $K^+$, $Na^+$, $NH_4^+$, $N(CH_3)_4^+$, $N(C_2H_5)_4^+$, $N(C_3H_7)_4^+$, and $N(CH_9)_4^+$.

For the surface reformation, for example, a method for chemically binding a specific functional group (e.g., a functional group such as a carboxyl group, a sulfonic acid group, a phosphoric acid group, and a bisphosphonic acid group) with a surface of a pigment or a method for subjecting a pigment to a wet oxidization treatment with at least one of a hypohalous acid and a salt of the hypohalous acid is used.

Examples of a method for producing the pigment bound with at least one kind of a hydrophilic group through the wet oxidization treatment include a method described in an example below in which an acid carbon black is used.

An "acid carbon black" mentioned above refers to a carbon black that exhibits acidity because the carbon black contains a carboxyl group over a surface of the carbon black particles.

It is preferable that a water-based pigment ink contain an acid carbon black having pH of 6 or lower, particularly 4 or lower. The acid carbon black is typically obtained by adequately oxidizing a carbon black for a color, such as furnace black and channel black by a surface reforming method such as an oxidization method using an oxidant (e.g., nitric acid, ozone, hydrogen peroxide, and nitrogen oxide) and a plasma treatment.

The acid carbon back is commercially available from, for example, Mitsubishi Chemical Corporation under product names: "MA100", "2400B", and "MA8", and from Degussa AG under a product name: "COLOR BLACK FW200".

A hypohalous acid salt is used to further oxidize an acid carbon black obtained. Examples of the hypohalous acid salt include sodium hypochlorite and potassium hypochlorite. Of these hypohalous acid salts, sodium hypochlorite is preferable in terms of reactivity.

Typically, the acid carbon black is oxidized by feeding to an appropriate amount of water, the acid carbon black and the hypohalous acid salt (e.g., sodium hypochlorite) that is at an effective halogen concentration with respect to the mass of the carbon black and in a range of from 10% through 30%, and stirring the acid carbon black and the hypohalous acid salt for 5 hours or longer, preferably for a time in a range of from about 10 hours through 15 hours at 50° C. or higher, preferably at a temperature in a range of from 95° C. through 105° C.

The obtained carbon black has a surface active hydrogen content of 1.5 mmol/g or greater.

Next, the generated product is filtrated, and a byproduct salt is removed through washing with ion-exchanged water. Further, the generated product is purified and concentrated through a separation membrane having a pore diameter of 0.01 m or less, such as a reverse osmosis membrane and an ultrafiltration membrane.

Typically, the concentrating is performed to make a thick pigment dispersion liquid having a content ratio of carbon black to water in a range of from about 10% by mass through 30% by mass. The obtained pigment dispersion liquid can be used as is as a water-based pigment ink. In this case, the carbon black concentration is preferably in a range of from 1% by mass through 20% by mass.

As the method for chemically binding a specific functional group (e.g., a functional group such as a carboxyl group, a sulfonic acid group, a phosphoric acid group, and a bisphosphonic acid group) with a surface of a pigment, for example, U.S. Pat. No. 5,851,280 describes a method for binding an organic group with a surface of a pigment (when the organic group is a part of a diazonium salt, binding the organic group through a diazonium reaction). The obtained surface-reformed pigment can be used for various purposes, such as inks, inkjet inks, paints, toners, plastics, and rubbers.

International Publication No. WO 2001/51566 describes a reformed pigment producing method for reacting a first chemical group and a second chemical group with each other to form a pigment bound with a third chemical group. The first chemical group contains at least one nucleophile and the second chemical group contains at least one electrophile, and vice versa. The pigment is used in ink compositions, particularly inkjet ink compositions.

Examples of the resin include homopolymers, copolymers, terpolymers, and polymers containing many different optional numbers of repeating units. Examples of the polymers include random polymers, branched polymers, alternating polymers, graft polymers, block polymers, star polymers, and comb polymers.

It is preferable that a part or a whole of hydrophilic groups of the resin of the self-dispersible pigments be ionized through neutralization with a base, like the hydrophilic groups of the resin dispersant.

A content of the pigment is preferably 1% by mass or greater but 15% by mass or less and more preferably 2% by mass or greater but 10% by mass or less of the total amount of the ink. When the content is 1% by mass or greater, the ink obtains a sufficient chromogenic property and a sufficient image density. On the other hand, when the content is 15% by mass or less, the ink is suppressed from viscosity thickening and dischargeability degradation, and there is also a cost advantage.

<Surfactant>

The surfactant is contained in order to improve permeability and wettability into plain paper and coated paper to improve fixability.

The surfactant is not particularly limited and may be appropriately selected depending on the intended purpose. Examples of the surfactant include fluorine-based surfactants, silicone-based surfactants, anionic surfactants, nonionic surfactants, and amphoteric surfactants. One of these surfactants may be used alone or two or more of these surfactants may be used in combination. Among these surfactants, silicone-based surfactants are preferable in terms of fixability over coated paper.

The silicone-based surfactants are not particularly limited and may be appropriately selected depending on the intended purpose. Examples of the silicone-based surfactants include side-chain-modified polydimethylsiloxane, both-terminal-modified polydimethylsiloxane, one-terminal-modified polydimethylsiloxane, and side-chain/both-terminal-modified polydimethylsiloxane. Among these silicone-based surfactants, preferable are polyether-modified silicone-based surfactants containing a polyoxyethylene group or a polyoxyethylene polyoxypropylene group as a modifying group.

The silicone-based surfactants may be commercially available products. Examples of the commercially available products include: TEGO TWIN 4000, TEGO WET KL 245, TEGO WET 250, TEGO WET 260, TEGO WET 265, TEGO WET 270, and TEGO WET 280 (all available from Tomoe Engineering Co., Ltd.); BYK-306, BYK-307, BYK-333, BYK-341, BYK-345, BYK-346, and BYK-348 (all available from Byk-Chemie Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all available from Shin-Etsu Chemical Co., Ltd.).

Examples of the fluorine-based surfactants include fluorine-based nonionic surfactants, fluorine-based anionic surfactants, fluorine-based amphoteric surfactants, and fluorine-based oligomer-based surfactants.

The number of carbons for which fluorine is substituted in the fluorine-based surfactants is preferably in a range of from 2 through 16 and more preferably in a range of from 4 through 16.

Examples of the fluorine-based nonionic surfactants include perfluoroalkyl phosphoric acid ester compounds, perfluoroalkyl-ethylene oxide adducts, and polyoxyalkyleneether polymer compounds containing a perfluoroalkylether group on a side chain. Among these fluorine-based nonionic surfactants, preferable are polyoxyalkyleneether polymer compounds containing a perfluoroalkylether group on a side chain because of a low foamability.

Examples of the fluorine-based anionic surfactants include perfluoroalkylsulfonic acid compounds, perfluoroalkylcarboxylic acid compounds, perfluoroalkylphosphoric acid ester compounds, and polyoxyalkyleneether polymer compounds containing a perfluoroalkylether group on a side chain.

Examples of the perfluoroalkylsulfonic acid compounds include perfluoroalkylsulfonic acids and perfluoroalkylsulfonic acid salts.

Examples of the perfluoroalkylcarboxylic acid compounds include perfluoroalkylcarboxylic acids and perfluoroalkylcarboxylic acid salts.

Examples of the perfluoroalkylphosphoric acid ester compounds include perfluoroalkylphosphoric acid esters and perfluoroalkylphosphoric acid ester salts.

Examples of the polyoxyalkyleneether polymer compounds containing a perfluoroalkylether group on a side chain include polyoxyalkyleneether polymers containing a perfluoroalkylether group on a side chain, sulfuric acid ester salts of the polyoxyalkyleneether polymers containing a perfluoroalkylether group on a side chain, and salts of the polyoxyalkyleneether polymers containing a perfluoroalkylether group on a side chain.

A counter ion of the salts in the fluorine-based anionic surfactants is not particularly limited and may be appropriately selected depending on the intended purpose. Examples of the counter ion include $Li^+$, $Na^+$, $K^+$, $NH_4^+$, $^+NH_3CH_2CH_2OH$, $^+NH_2(CH_2CH_2OH)_2$, and $^+NH(CH_2CH_2OH)_3$.

The fluorine-based surfactants may be commercially available products. Examples of the commercially available products include: SURFLON S-111, S-112, S-113, S-121, S-131, S-132, S-141, and S-145 (all available from Asahi Glass Co., Ltd.); FLUORAD FC-93, FC-95, FC-98, FC-129, FC-135, FC-170C, FC-430, and FC-431 (all available from Sumitomo 3M Limited); MEGAFAC F-470, F-1405, and F-474 (all available from DIC Corporation); ZONYL TBS, FSP, FSA, FSN-100, FSN, FSO-100, FSO, FS-300, and UR (all available from Du Pont Kabushiki Kaisha); FTERGENT FT-110, FT-250, FT-251, FT-400S, FT-150, and FT-400SW (all available from Neos Company Limited); and POLYFOX PF-136A, PF-156A, PF-151N, PF-154, and PF-159 (all available from Omnova Solutions Inc.).

Examples of the anionic surfactants include polyoxyethylenealkylether acetic acid salts, dodecylbenzenesulfonic acid salts, lauric acid salts, and polyoxyethylenealkylether sulfate salts.

Examples of the nonionic surfactants include polyoxyethylenealkylethers, polyoxypropylenealkylethers, polyoxyethylenealkylesters, polyoxyethylene sorbitan fatty acid esters, polyoxyethylenealkylphenylethers, polyoxyethylenealkylamines, and polyoxyethylenealkylamides.

A content of the surfactant is preferably 0.001% by mass or greater but 5% by mass or less and more preferably 0.5% by mass or greater but 3% by mass or less of the total amount of the ink. When the content is 0.001% by mass or greater but 5% by mass or less, it is possible to improve permeability and wettability into plain paper and coated paper and improve fixability.

<Water>

The water is not particularly limited and may be appropriately selected depending on the intended purpose. Examples of the water include pure water and ultrapure water such as ion-exchanged water, ultrafiltrated water, reverse osmotic water, and distilled water.

A content of the water is preferably 20% by mass or greater but 60% by mass or less of the total amount of the ink. When the content is 20% by mass or greater, it is possible to prevent viscosity increase and improve discharging stability. When the content is 60% by mass or less, a favorable wettability into a recording medium is obtained, and image qualities can be improved.

<Other Components>

The other components are not particularly limited and may be appropriately selected depending on the intended purpose. Examples of the other components include a pH adjuster, an antiseptic/fungicide, an anti-rust agent, an antioxidant, an ultraviolet absorber, an oxygen absorber, and a light stabilizer.

—pH Adjuster—

The pH adjuster is added in order to stabilize a dispersion state and stabilize discharging. However, at pH of 11 or higher, an amount of an inkjet head or an ink supplying unit to be eluted is high. This leads to problems such as ink property change, leak, and discharging troubles. It is preferable to add the pH adjuster in kneading and dispersing the pigment together with the dispersant in water. This is because if the pH adjuster is added together with additives such as a water-soluble solvent and a permeating agent after the kneading and dispersing, the addition of the pH adjuster may destroy the dispersion depending on the kind of the pH adjuster.

Examples of the pH adjuster include alcohol amines, alkali metal hydroxides, ammonium hydroxides, phosphonium hydroxides, and alkali metal carbonates.

Examples of the alcohol amines include diethanolamine, triethanolamine, and 2-amino-2-ethyl-1,3-propanediol.

Examples of the alkali metal hydroxides include lithium hydroxide, sodium hydroxide, and potassium hydroxide.

Examples of the ammonium hydroxides include ammonium hydroxide and quaternary ammonium hydroxide.

Examples of the phosphonium hydroxides include quaternary phosphonium hydroxide.

Examples of the alkali metal carbonates include lithium carbonate, sodium carbonate, and potassium carbonate.

—Antiseptic/Fungicide—

Examples of the antiseptic/fungicide include sodium dehydroacetate, sodium sorbate, sodium 2-pyridinethiol-1-oxide, sodium benzoate, and pentachlorophenol sodium.

—Anti-Rust Agent—

Examples of the anti-rust agent include acidic sulfites, sodium thiosulfate, ammonium thiodiglycolate, diisopropylammonium nitrite, pentaerythritol tetranitrate, and dicyclohexylammonium nitrite.

—Antioxidant—

Examples of the antioxidant include phenol-based antioxidants (including hindered phenol-based antioxidants), amine-based antioxidants, sulfur-based antioxidants, and phosphorus-based antioxidants.

—Ultraviolet Absorber—

Examples of the ultraviolet absorber include benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

<Method for Producing Ink>

As a method for producing the ink, the ink can be produced by, for example, stirring and mixing the water, the organic solvents, the wax, and the pigment, and as needed, the other components. For the stirring and mixing, for example, a sand mill, a homogenizer, a ball mill, a paint shaker, an ultrasonic disperser, a stirrer using a typical stirring blade, a magnetic stirrer, and a high-speed disperser may be used.

In production of the ink, it is preferable to filter out coarse particles with, for example, a filter or a centrifuge, and degas the ink.

A viscosity of the ink at 25° C. is preferably 3 mPa·s or greater but 20 mPa·s or less and more preferably 5 mPa·s or greater but 15 mPa·s or less. When the viscosity is 3 mPa·s or greater, a gloss level can be improved. When the viscosity is 20 mPa·s or less, fixability over coated paper can be improved.

The viscosity of the ink at 25° C. can be measured with a viscometer RE80L (available from Toki Sangyo Co., Ltd.).

A surface tension of the ink at 25° C. is not particularly limited and may be appropriately selected depending on the intended purpose. However, the surface tension is preferably 40 mN/m or less.

The ink of the present invention can be favorably used for, for example, an ink stored container, various recording apparatuses according to an inkjet recording method, and recorded matters.

(Ink Stored Container)

An ink stored container of the present invention includes the ink of the present invention and a container storing the ink, and may further include other members appropriately selected as needed.

The container is not particularly limited and may be of any shape, any structure, any size, any material, etc. that may be appropriately selected depending on the intended purpose. Preferable examples of the container include a container including an ink bag made of, for example, an aluminium laminate film and a resin film.

Figure 2:
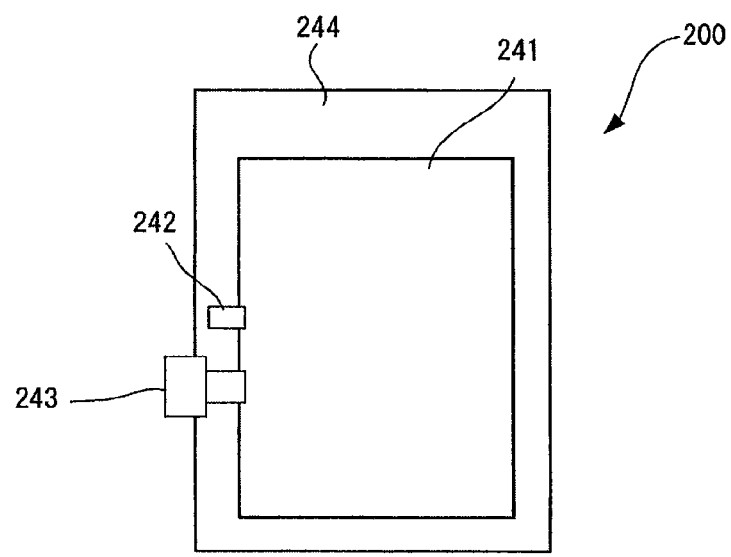
FIG. 2 is a schematic view illustrating an ink cartridge storing the ink bag of FIG. 1 in a cartridge case.

An example of an ink cartridge as the ink stored container will be described with reference to FIG. 1 and FIG. 2. FIG. 1 is a schematic view illustrating an example of an ink bag 241 of the ink cartridge. FIG. 2 is a schematic view illustrating an ink cartridge 200 storing the ink bag 241 of FIG. 1 in a cartridge case 244.

As illustrated in FIG. 1, the ink bag 241 is filled with an ink through an ink injecting port 242, and after evacuation of air remaining in the ink bag, the ink injecting port 242 is closed by fusion bonding. For use, an ink discharging port 243 made of a rubber material is pierced with a needle of a body of an apparatus in order for the ink to be supplied into the apparatus. The ink bag 241 is made of a gas-impermeable packaging material such as an aluminium laminate film. As illustrated in FIG. 2, the ink bag 241 is typically stored in the cartridge case 244 made of plastic, and in the form of the ink cartridge 200, used as attached onto various inkjet recording apparatuses in an attachable/detachable manner. The ink cartridge is particularly preferably used as attached on an inkjet recording apparatus of the present invention in an attachable/detachable manner.

(Inkjet Recording Apparatus)

An inkjet recording apparatus of the present invention includes the ink stored container of the present invention, preferably includes an ink flying unit configured to discharge the ink of the present invention, and further includes other units as needed.

<Ink Flying Unit>

The ink flying unit is a unit configured to apply a stimulus to the ink of the present invention to fly the ink and form an image. Examples of the ink flying unit include various nozzles configured to discharge an ink.

The stimulus can be generated by, for example, a stimulus generating unit. The stimulus is not particularly limited and may be appropriately selected depending on the intended purpose. Examples of the stimulus include heat (temperature), pressure, vibration, and light. One of these stimuli may be used alone or two or more of these stimuli may be used in combination. Among these stimuli, heat and pressure are preferable. Examples of the stimulus generating unit include heating devices, pressure devices, piezoelectric elements, vibration generating devices, ultrasonic oscillators, and lights. Specific examples of the stimulus generating unit include: piezoelectric actuators such as piezoelectric elements; thermal actuators using an electro-thermal converting element such as a heating resistor to utilize a phase change upon film boiling of a liquid; shape memory alloy actuators utilizing a phase change of a metal upon a temperature change; and electrostatic actuators utilizing an electrostatic force.

A method for flying the ink is not particularly limited and is different depending on, for example, the kind of the stimulus.

For example, when the stimulus is "heat", there is a method using, for example, a thermal head for applying a thermal energy corresponding to a recording signal to the ink in a recording head to generate bubbles in the ink by the thermal energy and discharge and jet the ink from nozzle holes of the recording head in a form of liquid droplets by a pressure of the bubbles. When the stimulus is "pressure", there is a method for, for example, applying a voltage to a piezoelectric element bonded to a position called a pressure chamber present in an ink flow path in a recording head to flex the piezoelectric element and shrink the cubic capacity of the pressure chamber to discharge and jet the ink from nozzle holes of the recording head in a form of liquid droplets.

<Other Units>

Examples of the other units include a heating unit, a stimulus generating unit, and a controlling unit.

Many known devices may be used as the heating unit. Examples of the heating unit include devices for, for example, forced-air heating, radiation heating, conduction heating, high-frequency drying, and microwave drying. One of these heating units may be used alone or two or more of these heating units may be used in combination.

A temperature for the heating may be varied depending on the kind and amount of a water-soluble solvent contained in the ink and a minimum filming temperature of a resin emulsion added, and may also be varied depending on the kind of a base material to be printed.

The temperature for the heating is preferably high, more preferably 40° C. or higher but 120° C. or lower, and yet more preferably 50° C. or higher but 90° C. or lower in terms of driability and a filming temperature.

Examples of the stimulus generating unit include heating devices, pressure devices, piezoelectric elements, vibration generating devices, ultrasonic oscillators, and lights. Specific examples of the stimulus generating unit include: piezoelectric actuators such as piezoelectric elements; thermal actuators using an electro-thermal converting element such as a heating resistor to utilize a phase change upon film boiling of a liquid; shape memory alloy actuators utilizing a phase change of a metal upon a temperature change; and electrostatic actuators utilizing an electrostatic force.

The controlling unit is not particularly limited and may be appropriately selected depending on the intended purpose so long as the controlling unit is capable of controlling the operations of each unit. Examples of the controlling unit include devices such as a sequencer and a computer.

Here, an example of the inkjet recording apparatus of the present invention will be described with reference to the drawings.

Figure 3:
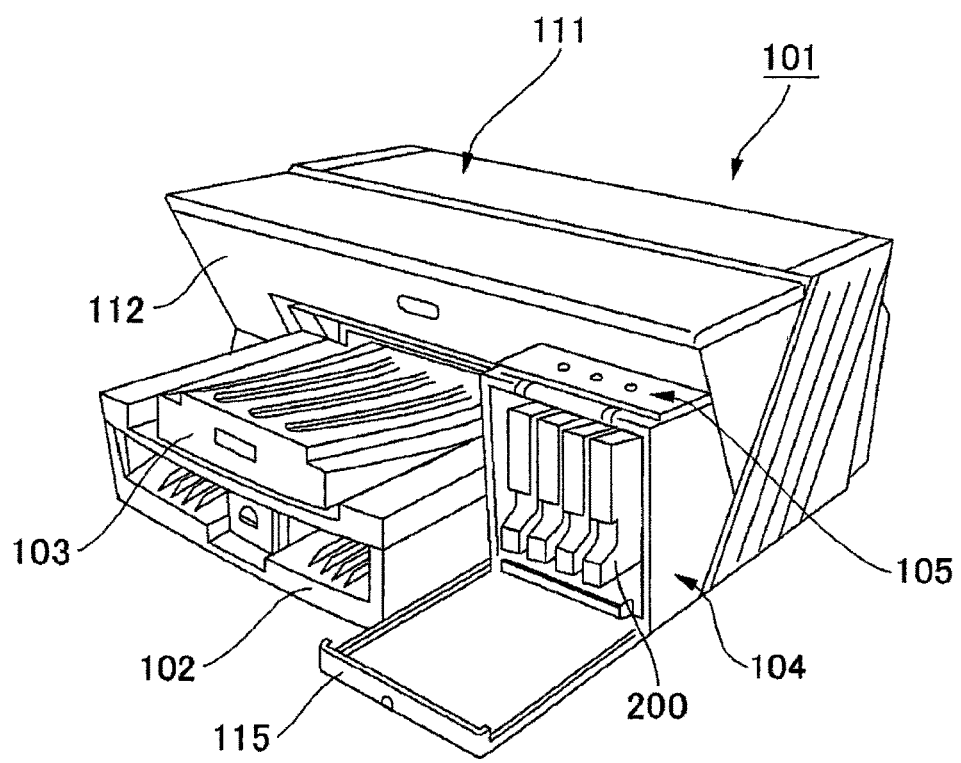
FIG. 3 is a perspective descriptive view of an example of an inkjet recording apparatus of the present invention in a state that a cover of an ink cartridge loading portion is opened.

FIG. 3 is a perspective view illustrating an example of a serial-type inkjet recording apparatus of the present invention. The recording apparatus includes an apparatus body 101, a paper feeding tray 102 attached on the apparatus body 101 and configured to load the apparatus body 101 with sheets, a paper ejecting tray 103 that is attached on the apparatus body 101 and over which sheets having a recorded (formed) image are stocked, and an ink stored container loading portion 104 that is at one end side of a front surface 112 of the apparatus body 101, is sticking out frontward from the front surface 112, and is less tall than a head cover 111. An operating unit 105 such as operating keys and a display is disposed over a top surface of the ink stored container loading portion 104. The ink stored container loading portion 104 includes an openable/closable front cover 115 to be loaded and unloaded with ink stored containers 200.

Figure 4:
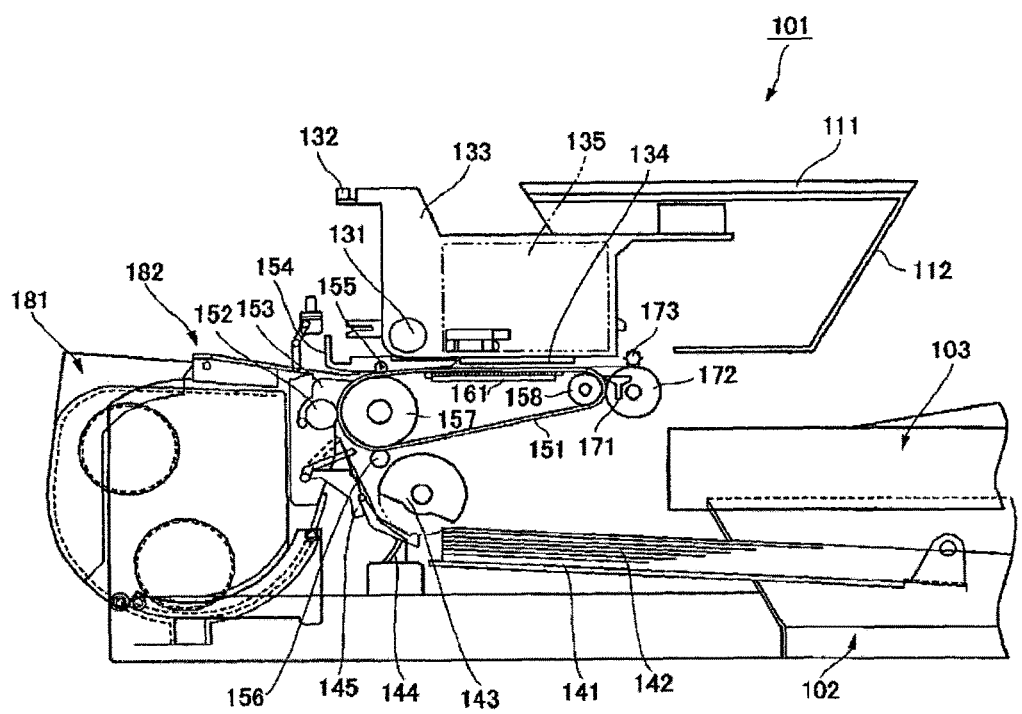
FIG. 4 is a schematic view illustrating an example of an inkjet recording apparatus of the present invention.
Figure 5:
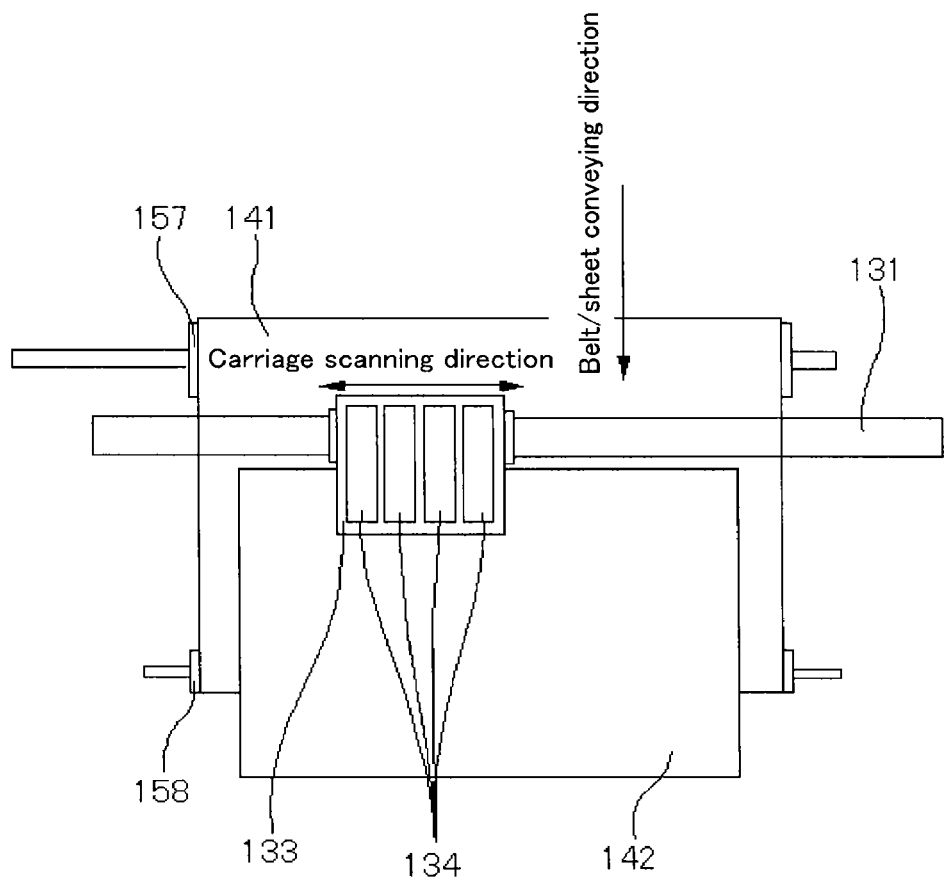
FIG. 5 is a partially enlarged cross-sectional view of the inkjet recording apparatus illustrated in FIG. 4.

As illustrated in FIG. 4 and FIG. 5 (which is a partially enlarged cross-sectional view of the recording apparatus of FIG. 4), in the apparatus body 101, a carriage 133 is supported in a manner slidable in a main-scanning direction on a guide rod 131 and a stay 132, which are guide members provided in a lateral bridging manner between unillustrated left and right side panels. The carriage 133 is configured to be moved and scanned in an arrow direction as illustrated in FIG. 5 by a main scanning motor.

Recording heads 134 including four inkjet recording heads configured to discharge ink droplets of yellow (Y), cyan (C), magenta (M), and black (Bk) colors are attached in the carriage 133 in a manner that a plurality of ink discharging ports are arranged in a direction intersecting the main-scanning direction and a direction in which ink droplets are discharged faces downward.

The inkjet recording heads constituting the recording heads 134 may be inkjet recording heads including as a unit configured to generate energy for discharging inks, a piezoelectric actuator such as a piezoelectric element, a thermal actuator using an electro-thermal converting element such as a heating resistor to utilize a phase change upon film boiling of a liquid, a shape memory alloy actuator utilizing a phase change of a metal upon a temperature change, an electrostatic actuator utilizing an electrostatic force, etc. The carriage 133 is mounted with sub tanks 135 for the colors configured to supply inks of the colors into the recording heads 134. The sub tanks 135 are supplied and replenished with inks from the ink stored containers 200 of the present invention loaded in the ink stored container loading portion 104 through unillustrated ink supplying tubes.

A paper feeding unit configured to feed sheets 142 stacked over a paper stacking portion (pressure plate) 141 of the paper feeding tray 102 includes a semicircular roll (paper feeding roll 143) configured to feed the sheets 142 one by one separately from the paper stacking portion 141, and a separation pad 144 disposed counter to the paper feeding roll 143 and made of a material having a high friction coefficient. The separation pad 144 is biased toward the paper feeding roll 143.

A conveying unit configured to convey a sheet 142 fed from the paper feeding unit below the recording heads 134 includes a conveying belt 151 configured to electrostatically attract and convey the sheet 142, a counter roller 152 configured to convey the sheet 142 brought from the paper feeding unit through a guide 145 while nipping the sheet 142 between the conveying belt 151 and the counter roller 152, a conveying guide 153 configured to make the sheet 142, which is brought approximately vertically upward, change course by about 90° and follow the conveying belt 151, and a leading end pressing roll 155 biased toward the conveying belt 151 by a pressing member 154.

There is also provided a charging roller 156, which is a charging unit configured to charge a surface of the conveying belt 151. The conveying belt 151 is an endless belt, is tensed between a conveying roller 157 and a tension roller 158, and is rotatable in a belt conveying direction. The conveying belt 151 includes an external layer constituting a sheet attracting surface and made of a resistance-uncontrolled resin material having a thickness of about 40 μm [e.g., a tetrafluoroethylene-ethylene copolymer (ETFE)], and a back layer (an intermediate resistance layer or an earth layer) made of the same material as the external layer and subjected to resistance control with carbon. A guide member 161 is disposed at the back side of the conveying belt 151 at a position corresponding to a printing region of the recording heads 134.

A paper ejecting unit configured to eject a sheet 142 recorded by the recording heads 134 includes a separation claw 171 configured to separate the sheet 142 from the conveying belt 151, a paper ejecting roller 172, and a paper ejecting roll 173. The paper ejecting tray 103 is disposed below the paper ejecting roller 172.

A both-side paper feeding unit 181 is attached on a rear surface of the apparatus body 101 in an attachable/detachable manner. The both-side paper feeding unit 181 is configured to take in a sheet 142 that is returned by means of reverse rotation of the conveying belt 151, overturn the sheet 142, and feed the sheet 142 to between the counter roller 152 and the conveying belt 151 again. A manual paper feeding unit 182 is provided over a top surface of the both-side paper feeding unit 181.

In the inkjet recording apparatus described above, each sheet 142 is fed from the paper feeding unit one by one separately, fed approximately vertically upward, guided by the guide 145, and conveyed while being nipped between the conveying belt 151 and the counter roller 152. Furthermore, the leading end of the sheet 142 is guided by the conveying guide 153 and pressed onto the conveying belt 151 by the leading end pressing roll 155, such that the conveying course of the sheet 142 is changed by about 90°. Here, because the conveying belt 151 is charged by the charging roller 156, the sheet 142 is conveyed by the conveying belt 151 while being electrostatically attracted to the conveying belt 151. Then, by the carriage 133 being moved, the recording heads 134 are driven according to an image signal to discharge ink droplets and record one line over the sheet 142 that is being stopped. Then, the sheet 142 is conveyed by a predetermined amount, and the next line is recorded over the sheet 142.

Upon reception of a recording completion signal or a signal indicative of arrival of the trailing end of the sheet 142 at the recording region, the recording operation is completed and the sheet 142 is ejected onto the paper ejecting tray 103. When a near-end of the amount of inks remaining in the sub tanks 135 is sensed, inks are replenished in a needed amount into the sub tanks 135 from the ink stored containers 200.

In the inkjet recording apparatus, when the inks in the ink stored containers 200 are used up, the casings of the ink stored containers 200 can be disassembled and the ink storages put inside can only be exchanged. The ink stored containers 200 can supply inks stably even when the ink stored containers 200 are installed upright at a front loading position. Therefore, even when the apparatus body 101 is set in a state of being blocked overhead, for example, when the apparatus body 101 is stored in a rack or when a thing is placed on top of the apparatus body 101, it is possible to exchange the ink stored containers 200 easily.

An example in which the present invention is applied to a serial-type (shuttle-type) inkjet recording apparatus including a scanning carriage has been described above. However, the present invention can also be applied to a line-type inkjet recording apparatus equipped with a line-type head.

The inkjet recording apparatus of the present invention can be applied to various types of recording according to an inkjet recording method. For example, the inkjet recording apparatus of the present invention can be particularly favorably applied to inkjet recording printers, facsimile apparatuses, copier apparatuses, and printer/facsimile/copier multifunction peripherals.

(Recorded Matter and Printed Matter)

A recorded matter used in the present invention includes a recording medium and an image recorded over the recording medium with the ink of the present invention.

The recorded matter has high image qualities with no bleeding, has an excellent temporal stability, and can be favorably used for various purposes as, for example, a handout over which various types of printing or images are recorded.

Furthermore, a printed matter of the present invention is a printed matter including a printing medium and a printed layer over the printing medium.

The printed layer contains a wax and a plurality of organic solvents.

As the plurality of organic solvents, the printed layer contains a compound having a solubility parameter of 9 or greater but 11 or less and a compound having a saturated vapor pressure at 100° C. of 20 mmHg or greater but 400 mmHg or less.

The printed matter of the present invention is obtained by delivering the ink of the present invention onto a printing medium. The printed matter may be a printed matter including the printing medium and an image printed over the printing medium with the ink of the present invention. The printed matter may be obtained by delivering the ink onto the printing medium to be used as building materials such as wallpapers and flooring materials such as a flooring. Formation of the printed matter means not only application of images with a meaning, such as characters and graphics over a printing medium but also application of images without a meaning, such as patterns over a printing medium (i.e., mere discharging of liquid droplets).

The recording medium is not particularly limited and may be appropriately selected depending on the intended purpose. Examples of the recording medium include plain paper, coated paper for printing, gloss paper, special paper, cloth, films, and OHP sheets. One of these recording media may be used alone or two or more of these recording media may be used in combination. Among these recording media, plain paper and coated paper for printing are preferable. The plain paper is advantageous in inexpensiveness. The coated paper for printing is advantageous in less expensiveness than gloss paper and providing a smooth and gloss image.

The recording medium is not limited to recording media commonly used, but, for example, building materials such as wallpapers and flooring materials and cloths, textiles, and leather for, for example, garments may be optionally used as the printing medium. Furthermore, with adjustment of a configuration of a path along which the printing medium is conveyed, for example, ceramics, glass, and metals can also be used as the printing medium.

EXAMPLES

The present invention will be described below by way of Examples. However, the present invention should not be construed as being limited to the Examples.

Preparation Example 1

Preparation of Pigment Dispersion "PD-1" (Black)

A self-dispersible pigment dispersion was produced in the same manner as a method described as a method A for [pigment surface reforming treatment] in Japanese Unexamined Patent Application Publication No. 2012-207202.

A carbon black (NIPEX 160 available from Degussa AG, with a BET specific surface area of 150 m²/g, an average primary particle diameter of 20 nm, pH of 4.0, and a DBP oil absorption of 620 g/100 g) (20 g), a compound represented by a structural formula (5) below (20 mmol) and ion-exchanged highly pure water (200 mL) were mixed at room temperature with a SILVERSON mixer (6,000 rpm).

When it was a case that pH of the obtained slurry was higher than 4, nitric acid (20 mmol) was added. Thirty minutes later, sodium nitrite (20 mmol) dissolved in a small amount of ion-exchanged highly pure water was slowly added into the mixture. The resultant was heated to 60° C. with stirring and made to undergo a reaction for 1 hour. A reformed pigment in which the compound represented by the structural formula (5) below was added to the carbon black was produced.

Next, pH of the reformed pigment was adjusted to 10 with a NaOH aqueous solution, and as a result, a reformed pigment dispersion was obtained 30 minutes later. The dispersion containing the pigment bound with at least one geminal bisphosphonic acid group or geminal bisphosphonic acid sodium salt and ion-exchanged highly pure water were subjected to ultrafiltration through a dialysis membrane and then subjected to ultrasonic dispersion, to obtain a self-dispersible black pigment dispersion PD-1 having a pigment solid concentration of 16% by mass and containing a bisphosphonic acid group as a hydrophilic functional group.

[Structural formula (5)]

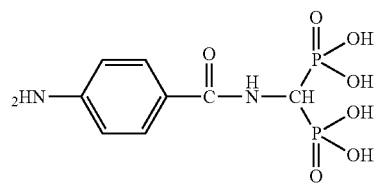

Preparation Example 2

Preparation of Pigment Dispersion "PD-2" (Black)

Materials prescribed below were premixed to produce a mixed slurry. The mixed slurry was subjected to circulation dispersion with a disk-type media mill (DMR TYPE available from Ashizawa Finetech Ltd.) using zirconia beads having a diameter of 0.05 mm and packed to 55% at a peripheral velocity of 10 m/s at a liquid temperature of 10° C. for 3 minutes.

Next, coarse particles were centrifugally separated with a centrifuge (MODEL-7700 available from Kubota Corporation), to obtain a black pigment dispersion PD-2 in which a pigment was dispersed with a dispersant containing an anionic hydrophilic group and that had a pigment solid concentration of 16% by mass.

[Prescription]
- Carbon black (NIPEX 160 available from Degussa AG, with a BET specific surface area of 150 $m^2/g$, an average primary particle diameter of 20 nm, pH of 4.0, and a DBP oil absorption of 620 g/100 g)—160 parts by mass
- Polyoxyethylene (POE) (m=40)-β-naphthylether (available from Takemoto Oil & Fat Co., Ltd.)—400 parts by mass
- Ion-exchanged water—440 parts by mass

Preparation Example 3

Preparation of Pigment Dispersion "PD-3" (Black)

A pigment dispersion PD-3 in which a pigment coated with a resin containing an amide group and a polyoxyethylene group as hydrophilic groups was dispersed was prepared.

For preparation of a polymer solution, a 1 L flask equipped with a mechanical stirrer, a thermometer, a nitrogen gas introducing tube, a reflux condenser, and a dropping funnel was internally purged with a nitrogen gas sufficiently. Then, styrene (11.2 g), acrylic acid (2.8 g), lauryl methacrylate (12.0 g), polyethylene glycol methacrylate (4.0 g), a styrene macromer (product name: AS-6 available from Toagosei Co., Ltd.) (4.0 g), and mercaptoethanol (0.4 g) were put in the flask and heated to 65° C.

Next, a mixture solution of styrene (100.8 g), acrylic acid (25.2 g), lauryl methacrylate (108.0 g), polyethylene glycol methacrylate (36.0 g), hydroxyethyl methacrylate (60.0 g), a styrene macromer (product name: AS-6 available from Toagosei Co., Ltd.) (36.0 g), mercaptoethanol (3.6 g), azobisdimethylvaleronitrile (2.4 g), and methyl ethyl ketone (18 g) was dropped into the flask in 2.5 hours.

After the dropping was completed, a mixture solution of azobisdimethylvaleronitrile (0.8 g) and methyl ethyl ketone (18 g) was dropped into the flask in 0.5 hours. After the materials were aged at 65° C. for 1 hour, azobisdimethylvaleronitrile (0.8 g) was added, and the materials were aged for another 1 hour. After the reaction was completed, methyl ethyl ketone (364 g) was added into the flask, to obtain a polymer solution (800 g) having a concentration of 50% by mass. Next, a part of the polymer solution was dried to measure a weight average molecular weight, which was 15,000.

The obtained polymer solution (28 g), a carbon black (26 g), a 1 mol/L potassium hydroxide solution (13.6 g), methyl ethyl ketone (20 g), and ion-exchanged water (30 g) were stirred sufficiently.

After this, the resultant was kneaded with a 3-roll mill (product name: NR-84A available from Noritake Co., Limited) 20 times. The obtained paste was fed to ion-exchanged water (200 g), stirred sufficiently, and then evacuated of methyl ethyl ketone and a part of water by distillation with an evaporator, to obtain a resin-coated pigment dispersion PD-3 having a pigment content ratio of 16% by mass.

Preparation Example 4

Preparation of Pigment Dispersion "PD-4" (Cyan)

A cyan pigment dispersion PD-4 having a pigment solid concentration of 16% by mass was obtained in the same manner as in Preparation Example 1, except that the carbon black (20 g) used in Preparation Example 1 was changed to Pigment Blue 15:3 (CHROMOFINE BLUE available from Dainichiseika Color & Chemicals Mfg. Co., Ltd.) (20 g).

Preparation Example 5

Preparation of Pigment Dispersion "PD-5" (Magenta)

A magenta pigment dispersion PD-5 having a pigment solid concentration of 16% by mass was obtained in the same manner as in Preparation Example 1, except that the carbon black (20 g) used in Preparation Example 1 was changed to Pigment Red 122 (TONER MAGENTA EO02 available from Clariant AG) (20 g).

Preparation Example 6

Pigment Dispersion "PD-6" (Yellow)

A yellow pigment dispersion PD-6 having a pigment solid concentration of 16% by mass was obtained in the same manner as in Preparation Example 1, except that the carbon black (20 g) used in Preparation Example 1 was changed to Pigment Yellow 74 (FAST YELLOW 531 available from Dainichiseika Color & Chemicals Mfg. Co., Ltd.) (20 g).

Example 1

Production of Ink

The pigment dispersion PD-1 (50.00% by mass), a polyethylene wax AQUACER 531 (available from Byk-Chemie Japan KK, with a nonvolatile content of 45% by mass) (2.22% by mass), 3-ethyl-3-hydroxymethyloxetane (30.00% by mass), propylene glycol monopropylether (10.0% by mass), a silicone-based surfactant (TEGO WET 270 available from Tomoe Engineering Co., Ltd.) (2.00% by mass), and ion-exchanged water (balance) were mixed, stirred for 1 hour, and filtrated through a membrane filter having an average pore diameter of 1.2 μm, to obtain an ink of Example 1.

Examples 2 to 21 and Comparative Examples 1 to 10

Production of Ink

Inks of Examples 2 to 21 and Comparative Examples 1 to 10 were produced in the same manner as in Example 1, except that the composition and contents used in Example 1 were changed to the composition and contents of Examples 2 to 21 and Comparative Examples 1 to 10 presented in Table 1 to Table 7. Values in Table 1 to Table 7 are in the unit of % by mass.

Example 22

Production of Ink

A clear ink of Example 22 was produced in the same manner as in Example 1, except that ion-exchanged water (50.00% by mass) was used instead of the pigment dispersion PD-1 (50.00% by mass) used in Example 1.

TABLE 1

|  | Material name | Examples 1 | 2 | 3 | 4 | 5 |
|---|---|---|---|---|---|---|
| Pigment dispersion | Preparation Example 1: PD-1 (black) | 50.00 | 50.00 | 50.00 | — | — |
|  | Preparation Example 2: PD-2 (black) | — | — | — | — | — |
|  | Preparation Example 3: PD-3 (black) | — | — | — | — | — |
|  | Preparation Example 4: PD-4 (cyan) | — | — | — | 25.00 | — |
|  | Preparation Example 5: PD-5 (magenta) | — | — | — | — | 50.00 |
|  | Preparation Example 6: PD-6 (yellow) | — | — | — | — | — |
| Wax | AQUACER 531 | 2.22 | 2.22 | 2.22 | — | 2.22 |
|  | AQUACER 515 | — | — | — | 2.86 | — |
|  | AQUACER 537 | — | — | — | — | — |
| Specific organic solvent 1: (A) | N,N-dimethyl-β-butoxypropionamide | — | — | — | — | 30.00 |
|  | N,N-dimethyl-β-ethoxypropionamide | — | 15.00 | — | — | — |
|  | 3-ethyl-3-hydroxymethyloxetane | 30.00 | 15.00 | 30.00 | 20.00 | — |
| Specific organic solvent 2: (B) | Propylene glycol monopropylether | 10.00 | 10.00 | 5.00 | 20.00 | — |
|  | Propylene glycol monomethylether | — | — | 5.00 | — | 10.00 |
|  | 1,2-propanediol | — | — | — | — | — |
| Other organic solvents | 2-pyrrolidone | — | — | — | — | — |
|  | 1,2-hexanediol | — | — | — | — | — |
|  | Diethylene glycol | — | — | — | — | — |
| Surfactant | TEGO WET 270 | 2.00 | 2.00 | 2.00 | 2.00 | 2.00 |
|  | ZONYL FS-300 | — | — | — | — | — |
| Water | Ion-exchanged water | Balance | Balance | Balance | Balance | Balance |
|  | Total (% by mass) | 100.00 | 100.00 | 100.00 | 100.00 | 100.00 |
|  | Mass ratio (A/B) | 3 | 3 | 3 | 1 | 3 |

TABLE 2

|  | Material name | Examples 6 | 7 | 8 | 9 | 10 |
|---|---|---|---|---|---|---|
| Pigment dispersion | Preparation Example 1: PD-1 (black) | — | 50.00 | 50.00 | 50.00 | 50.00 |
|  | Preparation Example 2: PD-2 (black) | — | — | — | — | — |
|  | Preparation Example 3: PD-3 (black) | — | — | — | — | — |
|  | Preparation Example 4: PD-4 (cyan) | — | — | — | — | — |
|  | Preparation Example 5: PD-5 (magenta) | — | — | — | — | — |
|  | Preparation Example 6: PD-6 (yellow) | 25.00 | — | — | — | — |
| Wax | AQUACER 531 | 2.22 | — | — | 0.018 | 0.022 |
|  | AQUACER 515 | — | — | 2.86 | — | — |
|  | AQUACER 537 | — | 3.33 | — | — | — |
| Specific organic solvent 1: (A) | N,N-dimethyl-β-butoxypropionamide | — | — | — | — | — |
|  | N,N-dimethyl-β-ethoxypropionamide | 30.00 | — | — | — | — |
|  | 3-ethyl-3-hydroxymethyloxetane | — | 30.00 | 30.00 | 30.00 | 30.00 |
| Specific organic solvent 2: (B) | Propylene glycol monopropylether | — | 10.00 | 10.00 | 10.00 | 10.00 |
|  | Propylene glycol monomethylether | — | — | — | — | — |
|  | 1,2-propanediol | 10.00 | — | — | — | — |
| Other organic solvents | 2-pyrrolidone | — | — | — | — | — |
|  | 1,2-hexanediol | — | — | — | — | — |
|  | Diethylene glycol | — | — | — | — | — |
| Surfactant | TEGO WET 270 | 2.00 | 2.00 | 2.00 | 2.00 | 2.00 |
|  | ZONYL FS-300 | — | — | — | — | — |
| Water | Ion-exchanged water | Balance | Balance | Balance | Balance | Balance |
|  | Total (% by mass) | 100.00 | 100.00 | 100.00 | 100.00 | 100.00 |
|  | Mass ratio (A/B) | 3 | 3 | 3 | 3 | 3 |

TABLE 3

|  | Material name | Examples 11 | 12 | 13 | 14 | 15 |
|---|---|---|---|---|---|---|
| Pigment dispersion | Preparation Example 1: PD-1 (black) | 50.00 | 40.00 | 50.00 | 40.00 | 50.00 |
|  | Preparation Example 2: PD-2 (black) | — | — | — | — | — |
|  | Preparation Example 3: PD-3 (black) | — | — | — | — | — |
|  | Preparation Example 4: PD-4 (cyan) | — | — | — | — | — |

TABLE 3-continued

|  | Material name | Examples 11 | 12 | 13 | 14 | 15 |
|---|---|---|---|---|---|---|
|  | Preparation Example 5: PD-5 (magenta) | — | — | — | — | — |
|  | Preparation Example 6: PD-6 (yellow) | — | — | — | — | — |
| Wax | AQUACER 531 | 22.22 | 26.67 | 0.22 | 11.11 | 2.22 |
|  | AQUACER 515 | — | — | — | — | — |
|  | AQUACER 537 | — | — | — | — | — |
| Specific organic solvent 1: (A) | N,N-dimethyl-β-butoxypropionamide | — | — | — | — | — |
|  | N,N-dimethyl-β-ethoxypropionamide | — | — | — | — | — |
|  | 3-ethyl-3-hydroxymethyloxetane | 20.00 | 20.00 | 5.00 | 35.00 | 30.00 |
| Specific organic solvent 2: (B) | Propylene glycol monopropylether | 5.00 | 5.00 | 40.00 | 5.00 | 10.00 |
|  | Propylene glycol monomethylether | — | — | — | — | — |
|  | 1,2-propanediol | — | — | — | — | — |
| Other organic solvents | 2-pyrrolidone | — | — | — | — | — |
|  | 1,2-hexanediol | — | — | — | — | — |
|  | Diethylene glycol | — | — | — | — | — |
| Surfactant | TEGO WET 270 | 2.00 | 2.00 | 2.00 | 2.00 | — |
|  | ZONYL FS-300 | — | — | — | — | 5.00 |
| Water | Ion-exchanged water | Balance | Balance | Balance | Balance | Balance |
|  | Total (% by mass) | 100.00 | 100.00 | 100.00 | 100.00 | 100.00 |
|  | Mass ratio (A/B) | 4 | 4 | 0.1 | 7 | 3 |

TABLE 4

|  | Material name | Examples 16 | 17 | 18 | 19 | 20 |
|---|---|---|---|---|---|---|
| Pigment dispersion | Preparation Example 1: PD-1 (black) | 50.00 | 50.00 | 50.00 | 40.00 | — |
|  | Preparation Example 2: PD-2 (black) | — | — | — | — | 50.00 |
|  | Preparation Example 3: PD-3 (black) | — | — | — | — | — |
|  | Preparation Example 4: PD-4 (cyan) | — | — | — | — | — |
|  | Preparation Example 5: PD-5 (magenta) | — | — | — | — | — |
|  | Preparation Example 6: PD-6 (yellow) | — | — | — | — | — |
| Wax | AQUACER 531 | 1.11 | 2.22 | 2.22 | 2.22 | 2.22 |
|  | AQUACER 515 | — | — | — | — | — |
|  | AQUACER 537 | — | — | — | — | — |
| Specific organic solvent 1: (A) | N,N-dimethyl-β-butoxypropionamide | — | — | — | — | — |
|  | N,N-dimethyl-β-ethoxypropionamide | — | — | — | — | — |
|  | 3-ethyl-3-hydroxymethyloxetane | 15.00 | 20.00 | 35.00 | 35.00 | 30.00 |
| Specific organic solvent 2: (B) | Propylene glycol monopropylether | 5.00 | 10.00 | 10.00 | 20.00 | 10.00 |
|  | Propylene glycol monomethylether | — | — | — | — | — |
|  | 1,2-propanediol | — | — | — | — | — |
| Other organic solvents | 2-pyrrolidone | — | — | — | — | — |
|  | 1,2-hexanediol | — | — | — | — | — |
|  | Diethylene glycol | — | — | — | — | — |
| Surfactant | TEGO WET 270 | 2.00 | 2.00 | 2.00 | 2.00 | 2.00 |
|  | ZONYL FS-300 | — | — | — | — | — |
| Water | Ion-exchanged water | Balance | Balance | Balance | Balance | Balance |
|  | Total (% by mass) | 100.00 | 100.00 | 100.00 | 100.00 | 100.00 |
|  | Mass ratio (A/B) | 3 | 2 | 3.5 | 1.8 | 3 |

TABLE 5

|  | Material name | Examples 21 | 22 |
|---|---|---|---|
| Pigment dispersion | Preparation Example 1: PD-1 (black) | — | — |
|  | Preparation Example 2: PD-2 (black) | — | — |
|  | Preparation Example 3: PD-3 (black) | 50.00 | — |
|  | Preparation Example 4: PD-4 (cyan) | — | — |
|  | Preparation Example 5: PD-5 (magenta) | — | — |
|  | Preparation Example 6: PD-6 (yellow) | — | — |
| Wax | AQUACER 531 | 2.22 | 2.22 |
|  | AQUACER 515 | — | — |
|  | AQUACER 537 | — | — |
| Specific organic solvent 1: (A) | N,N-dimethyl-β-butoxypropionamide | — | — |
|  | N,N-dimethyl-β-ethoxypropionamide | — | — |
|  | 3-ethyl-3-hydroxymethyloxetane | 15.00 | 50.00 |

TABLE 5-continued

|  | | Examples | |
|---|---|---|---|
| | Material name | 21 | 22 |
| Specific organic solvent 2: (B) | Propylene glycol monopropylether | 3.00 | 10.00 |
| | Propylene glycol monomethylether | — | — |
| | 1,2-propanediol | — | — |
| Other organic solvents | 2-pyrrolidone | — | — |
| | 1,2-hexanediol | — | — |
| | Diethylene glycol | — | — |
| Surfactant | TEGO WET 270 | 2.00 | 2.00 |
| | ZONYL FS-300 | — | — |
| Water | Ion-exchanged water | Balance | Balance |
| | Total (% by mass) | 100.00 | 100.00 |
| | Mass ratio (A/B) | 5 | 5 |

TABLE 6

| | | Comparative Examples | | | | |
|---|---|---|---|---|---|---|
| | Material name | 1 | 2 | 3 | 4 | 5 |
| Pigment dispersion | Preparation Example 1: PD-1 (black) | 50.00 | 50.00 | 50.00 | 50.00 | — |
| | Preparation Example 2: PD-2 (black) | — | — | — | — | — |
| | Preparation Example 3: PD-3 (black) | — | — | — | — | — |
| | Preparation Example 4: PD-4 (cyan) | — | — | — | — | 25.00 |
| | Preparation Example 5: PD-5 (magenta) | — | — | — | — | — |
| | Preparation Example 6: PD-6 (yellow) | — | — | — | — | — |
| Wax | AQUACER 531 | 2.22 | 2.22 | — | — | 2.22 |
| | AQUACER 515 | — | — | — | — | — |
| | AQUACER 537 | — | — | — | — | — |
| Specific organic solvent 1: (A) | N,N-dimethyl-β-butoxypropionamide | — | — | — | — | — |
| | N,N-dimethyl-β-ethoxypropionamide | — | — | — | — | — |
| | 3-ethyl-3-hydroxymethyloxetane | 40.00 | — | 30.00 | 40.00 | 40.00 |
| Specific organic solvent 2: (B) | Propylene glycol monopropylether | — | 20.00 | 10.00 | — | — |
| | Propylene glycol monomethylether | — | — | — | — | — |
| | 1,2-propanediol | — | — | — | — | — |
| Other organic solvents | 2-pyrrolidone | — | — | — | — | — |
| | 1,2-hexanediol | — | — | — | — | — |
| | Diethylene glycol | — | — | — | — | — |
| Surfactant | TEGO WET 270 | 2.00 | 2.00 | 2.00 | 2.00 | 2.00 |
| | ZONYL FS-300 | — | — | — | — | — |
| Water | Ion-exchanged water | Balance | Balance | Balance | Balance | Balance |
| | Total (% by mass) | 100.00 | 100.00 | 100.00 | 100.00 | 100.00 |
| | Mass ratio (A/B) | — | — | 3 | — | — |

TABLE 7

| | | Comparative Examples | | | | |
|---|---|---|---|---|---|---|
| | Material name | 6 | 7 | 8 | 9 | 10 |
| Pigment dispersion | Preparation Example 1: PD-1 (black) | — | — | 50.00 | 50.00 | 50.00 |
| | Preparation Example 2: PD-2 (black) | — | — | — | — | — |
| | Preparation Example 3: PD-3 (black) | — | — | — | — | — |
| | Preparation Example 4: PD-4 (cyan) | — | — | — | — | — |
| | Preparation Example 5: PD-5 (magenta) | 50.00 | — | — | — | — |
| | Preparation Example 6: PD-6 (yellow) | — | 25.00 | — | — | — |
| Wax | AQUACER 531 | — | 2.22 | 2.22 | 2.22 | 2.22 |
| | AQUACER 515 | 2.86 | — | — | — | — |
| | AQUACER 537 | — | — | — | — | — |
| Specific organic solvent 1: (A) | N,N-dimethyl-β-butoxypropionamide | — | — | — | — | — |
| | N,N-dimethyl-β-ethoxypropionamide | — | — | — | — | — |
| | 3-ethyl-3-hydroxymethyloxetane | 30.00 | 40.00 | — | — | — |
| Specific organic solvent 2: (B) | Propylene glycol monopropylether | — | — | — | — | — |
| | Propylene glycol monomethylether | — | — | — | — | — |
| | 1,2-propanediol | — | — | 10.00 | 10.00 | — |
| Other organic solvents | 2-pyrrolidone | — | — | 4.00 | 1.00 | 5.00 |
| | 1,2-hexanediol | — | — | 4.00 | 8.00 | 5.00 |
| | Diethylene glycol | — | — | — | 1.00 | 5.00 |
| Surfactant | TEGO WET 270 | 2.00 | 2.00 | 2.00 | 2.00 | 2.00 |
| | ZONYL FS-300 | — | — | — | — | — |
| Water | Ion-exchanged water | Balance | Balance | Balance | Balance | Balance |
| | Total (% by mass) | 100.00 | 100.00 | 100.00 | 100.00 | 100.00 |
| | Mass ratio (A/B) | — | — | — | — | — |

Details of the components presented in Table 1 to Table 7 are as follows.

—Compound Having Solubility Parameter (SP Value) of 9 or Greater but 11 or Less (Specific Organic Solvent 1)—

N,N-dimethyl-β-butoxypropionamide (with a SP Value of 9.8, available from Idemitsu Kosan Co., Ltd.)

N,N-dimethyl-β-ethoxypropionamide (with a SP value of 9.8, available from Idemitsu Kosan Co., Ltd.)

3-Ethyl-3-hydroxymethyloxetane (with a SP value of 10.7, available from Ube Industries, Ltd.)

—Compound Having Saturated Vapor Pressure at 100° C. of 20 mmHg or Greater but 400 mmHg or Less (Specific Organic Solvent 2)—

Propylene glycol monopropylether (with a saturated vapor pressure at 100° C. of 105 mmHg, available from Tokyo Chemical Industry Co., Ltd.)

Propylene glycol monomethylether (with a saturated vapor pressure at 100° C. of 380 mmHg, product name: HISOLVE MP available from Toho Chemical Industry Co., Ltd.)

1,2-Propanediol (with a saturated vapor pressure at 100° C. of 23 mmHg, available from Sigma-Aldrich Corporation)

—Other Organic Solvents—

2-Pyrrolidone (with a saturated vapor pressure at 100° C. of lower than 10 mmHg and a SP value of 11.2)

1,2-Hexanediol (with a saturated vapor pressure at 100° C. of lower than 13 mmHg and a SP value of 11.8)

Diethylene glycol (with a saturated vapor pressure at 1000° C. of lower than 16 mmHg and a SP value of 14.6)

—Wax—

AQUACER 531 (a polyethylene wax with a nonvolatile content of 45% by mass, available from Byk-Chemie Japan KK, with a melting pint of 130° C. and a volume average particle diameter of 123 nm)

AQUACER 515 (a polyethylene wax with a nonvolatile content of 35% by mass, available from Byk-Chemie Japan KK, with a melting point of 135° C. and a volume average particle diameter of 33 nm)

AQUACER 537 (a paraffin wax with a nonvolatile content of 30% by mass, available from Byk-Chemie Japan KK, with a melting point of 110° C. and a volume average particle diameter of 43 nm)

—Surfactant—

TEGO WET 270 (a silicone-based surfactant with a solid content of 100% by mass, available from Tomoe Engineering Co., Ltd.)

ZONYL FS-300 (a fluorine-based surfactant with a solid content of 40% by mass, available from Du Pont Kabushiki Kaisha)

<Measurement of Ink Viscosity>

A viscosity of each ink obtained was measured with a rotary viscometer (a viscometer RE80L, cone plate type, available from Toki Sangyo Co., Ltd.) at 25° C. Specifically, 1.1 mL of each ink was picked and poured into a sample cup of the viscometer. After the sample cup was set in the body of the viscometer and left to stand still for 1 minute, a rotor of the viscometer was rotated, and a value at 1 minute later was read. The rotation speed in the viscosity measurement was adjusted such that a torque would be constant in a range of from 40% through 80%.

A content of a wax, a kind of the wax, a mass ratio (wax/specific organic solvent 1), a mass ratio (wax/specific organic solvent 2), a mass ratio (specific organic solvent 1/specific organic solvent 2), and a kind of a surfactant in each ink and a viscosity of each ink at 25° C. are presented in Table 8.

TABLE 8

|  | Ink color | Content of wax [% by mass] | Kind of wax | Mass ratio (wax/specific organic solvent 1) | Mass ratio (wax/specific organic solvent 2) | Solvent 1/solvent 2 | Kind of surfactant | Ink viscosity (mPa·s) |
|---|---|---|---|---|---|---|---|---|
| Ex. 1 | Black | 1.000 | Polyethylene | 0.0333 | 0.1000 | 3 | Silicone-based | 7.5 |
| Ex. 2 | Black | 1.000 | Polyethylene | 0.0333 | 0.1000 | 3 | Silicone-based | 7.1 |
| Ex. 3 | Black | 1.000 | Polyethylene | 0.0333 | 0.1000 | 3 | Silicone-based | 7.3 |
| Ex. 4 | Cyan | 1.000 | Polyethylene | 0.0500 | 0.0500 | 1 | Silicone-based | 6.5 |
| Ex. 5 | Magenta | 1.000 | Polyethylene | 0.0333 | 0.1000 | 3 | Silicone-based | 8.0 |
| Ex. 6 | Yellow | 1.000 | Polyethylene | 0.0333 | 0.1000 | 3 | Silicone-based | 5.9 |
| Ex. 7 | Black | 1.000 | Paraffin | 0.0333 | 0.1000 | 3 | Silicone-based | 8.2 |
| Ex. 8 | Black | 1.000 | Polyethylene | 0.0333 | 0.1000 | 3 | Silicone-based | 7.5 |
| Ex. 9 | Black | 0.008 | Polyethylene | 0.0003 | 0.0008 | 3 | Silicone-based | 8.4 |
| Ex. 10 | Black | 0.010 | Polyethylene | 0.0003 | 0.0010 | 3 | Silicone-based | 8.6 |
| Ex. 11 | Black | 10.000 | Polyethylene | 0.3333 | 1.0000 | 4 | Silicone-based | 13.5 |
| Ex. 12 | Black | 12.000 | Polyethylene | 0.4000 | 1.2000 | 4 | Silicone-based | 14.5 |
| Ex. 13 | Black | 0.100 | Polyethylene | 0.0200 | 0.0025 | 0.1 | Silicone-based | 11.6 |
| Ex. 14 | Black | 5.000 | Polyethylene | 0.1429 | 1.0000 | 7 | Silicone-based | 9.2 |
| Ex. 15 | Black | 1.000 | Polyethylene | 0.0333 | 0.1000 | 3 | Fluorine-based | 7.9 |
| Ex. 16 | Black | 0.500 | Polyethylene | 0.0333 | 0.1000 | 3 | Silicone-based | 3.5 |
| Ex. 17 | Black | 1.000 | Polyethylene | 0.0500 | 0.1000 | 2 | Silicone-based | 5.0 |
| Ex. 18 | Black | 1.000 | Polyethylene | 0.0333 | 0.1000 | 3.5 | Silicone-based | 15.0 |
| Ex. 19 | Black | 1.000 | Polyethylene | 0.0333 | 0.1000 | 1.8 | Silicone-based | 16.2 |
| Ex. 20 | Black | 1.000 | Polyethylene | 0.0400 | 0.0667 | 3 | Silicone-based | 9.0 |
| Ex. 21 | Black | 1.000 | Polyethylene | 0.0667 | 0.3333 | 5 | Silicone-based | 6.6 |
| Ex. 22 | Clear ink | 1.000 | Polyethylene | 0.0333 | 0.1000 | 5 | Silicone-based | 5.6 |
| Comp. Ex. 1 | Black | 1.000 | Polyethylene | 0.0250 | — | — | Silicone-based | 8.3 |
| Comp. Ex. 2 | Black | 1.000 | Polyethylene | — | 0.1000 | — | Silicone-based | 4.4 |
| Comp. Ex. 3 | Black | — | — | — | — | 3 | Silicone-based | 7.9 |

TABLE 8-continued

|  | Ink color | Content of wax [% by mass] | Kind of wax | Mass ratio (wax/specific organic solvent 1) | Mass ratio (wax/specific organic solvent 2) | Solvent 1/solvent 2 | Kind of surfactant | Ink viscosity (mPa · s) |
|---|---|---|---|---|---|---|---|---|
| Comp. Ex. 4 | Black | — | — | — | — | — | Silicone-based | 8.5 |
| Comp. Ex. 5 | Cyan | 1.000 | Polyethylene | 0.0250 | — | — | Silicone-based | 6.0 |
| Comp. Ex. 6 | Magenta | 1.000 | Polyethylene | 0.0250 | — | — | Silicone-based | 7.5 |
| Comp. Ex. 7 | Yellow | 1.000 | Polyethylene | 0.0250 | — | — | Silicone-based | 7.0 |
| Comp. Ex. 8 | Black | 1.000 | Polyethylene | — | — | — | Silicone-based | 5.2 |
| Comp. Ex. 9 | Black | 1.000 | Polyethylene | — | — | — | Silicone-based | 6.3 |
| Comp. Ex. 10 | Black | 1.000 | Polyethylene | — | — | — | Silicone-based | 4.5 |

Next, image density, a gloss level, fixability, and transferability of each ink produced were evaluated in the manners described below. The results are presented in Table 9.

<Image Density>

Under 23° C. and 50% RH conditions, an inkjet printer (IPSIO GX5000 available from Ricoh Co., Ltd.) was loaded with each ink. Next, a chart that was generated with MICROSOFT WORD 2000 (available from Microsoft Corporation) and in which a general symbol 2223 in JIS X 0208 (1997) was described at 64 point and 128 point was printed, and a region in which the general symbol at 64 point was printed was subjected to colorimetry with X-RITE 938 (available from X-Rite Inc.) to evaluate image density. Here, a printing mode was a "gloss paper-standard or beautiful" mode modified to "without chromatic compensation" by user setting for gloss paper made through a driver provided as an attachment to the inkjet printer.

The recording medium used was LUMIART GLOSS 90GSM (available from Mondi Corporate) (coat paper 1).

The general symbol 2223 in JIS X 0208 (1997) is a symbol having a square outer contour and painted solidly over the entire surface.

For evaluation of the clear ink of Example 22, the general symbol 2223 in JIS X 0208 (1997) was printed at 64 point with the ink of Example 1 in the manner described above, and then the clear ink of Example 22 was printed under the same conditions as the conditions for printing the ink of Example 1 at the position at which the ink of Example 1 was printed such that the clear ink would overlap the printed portion by Example 1.

The obtained region in which the general symbol was printed at 64 point was subjected to colorimetry to evaluate image density as a black ink. The obtained image density was evaluated according to the evaluation criteria described below.

—Evaluation Criteria for Black Ink—
AA: 2.00 or higher
A: 1.90 or higher but lower than 2.00
B: 1.80 or higher but lower than 1.90
C: Lower than 1.80.

—Evaluation Criteria for Cyan Ink—
AA: 2.00 or higher
A: 1.90 or higher but lower than 2.00
B: 1.80 or higher but lower than 1.90
C: Lower than 1.80

—Evaluation Criteria for Magenta Ink—
AA: 1.90 or higher
A: 1.80 or higher but lower than 1.90
B: 1.70 or higher but lower than 1.80
C: Lower than 1.70

—Evaluation Criteria for Yellow Ink—
AA: 1.00 or higher
A: 0.90 or higher but lower than 1.00
B: 0.80 or higher but lower than 0.90
C: Lower than 0.80

<Gloss Level>

A gloss level at 60° was measured with a handy gloss meter PC-IIM TYPE (available from Nippon Denshoku Industries Co., Ltd.) from the region in which the general symbol 2223 in JIS X 0208 (1997) was printed at 128 point in the coat paper 1 (LUMIART GLOSS 90GSM) used in the evaluation of image density. A gloss level was evaluated according to the criteria described below based on the obtained gloss level.

For evaluation of the clear ink of Example 22, the general symbol 2223 in JIS X 0208 (1997) was printed at 128 point with the ink of Example 1 in the manner described above, and then the clear ink of Example 22 was printed under the same conditions as the conditions for printing the ink of Example 1 at the position at which the ink of Example 1 was printed such that the clear ink would overlap the printed portion by Example 1.

A gloss level at 60° was measured in the same manner as described above from the obtained region in which the general symbol was printed at 128 point. A gloss level was evaluated according to the criteria described below based on the obtained gloss level.

[Evaluation Criteria]
AA: The gloss level was 30 or higher.
A: The gloss level was 25 or higher but lower than 30.
B: The gloss level was 20 or higher but lower than 25.
C: The gloss level was lower than 20.

<Fixability>

Under 23° C. and 50% RH conditions, an inkjet printer (IPSIO GX5000 available from Ricoh Co., Ltd.) was loaded with each ink. Next, a chart that was generated with MICROSOFT WORD 2000 (available from Microsoft Corporation) and in which a general symbol 2223 in JIS X 0208 (1997) was described at 128 point was printed, and the printed sheet was dried in a thermostat bath set to an internal temperature of 100° C. for 30 seconds. After this, the printed portion was scratched 10 times with an unprinted sheet, and the degree of pigment transfer to the scratching sheet was visually observed. Fixability was evaluated according to the evaluation criteria described below.

The recording medium and the sheet for scratching the printed portion were LUMIART GLOSS 90GSM (available from Mondi Corporate) (coat paper 1) and OK TOP COAT+ (with a basis weight of 73.3 g/cm², available from Oji Paper Co., Ltd.) (coat paper 2).

For evaluation of the clear ink of Example 22, the general symbol 2223 in JIS X 0208 (1997) was printed at 128 point with the ink of Example 1 in the manner described above, and then the clear ink of Example 22 was printed under the same conditions as the conditions for printing the ink of Example 1 at the position at which the ink of Example 1 was printed such that the clear ink would overlap the printed portion by Example 1. After this, the printed sheet was dried in a thermostat bath set to an internal temperature of 100° C. for 30 seconds, the printed portion was scratched 10 times with an unprinted sheet, and the degree of pigment transfer to the scratching sheet was visually observed. Fixability was evaluated according to the evaluation criteria described below.

[Evaluation Criteria]

A: Almost no pigment transfer to the recording medium was observed.

B: A slight pigment transfer to the recording medium was observed (a transfer to an area less than 10% of the entire recording medium).

C: An apparent pigment transfer to the recording medium was observed (a transfer to an area greater than or equal to 10% of the entire recording medium).

<Transferability>

Under 23° C. and 50% RH conditions, an inkjet printer (IPSIO GX5000 available from Ricoh Co., Ltd.) was loaded with each ink. Next, a chart that was generated with MICROSOFT WORD 2000 (available from Microsoft Corporation) and in which a general symbol 2223 in JIS X 0208 (1997) was described at 128 point was printed over a recording medium, and the printed portion was dried in a thermostat bath set to an internal temperature of 100° C. for 30 seconds. Immediately after this, an unprinted sheet (4 cm×4 cm) was overlapped with the printed portion, a rubber sheet having a size of 2 cm in length, 2 cm in width, and 0.2 cm in thickness was placed over the overlapped sheets in the center, a weight was put over the rubber sheet such that a pressure applied to the sheets from the rubber sheet would be 0.5 kgf/cm², and the members were left to stand under 23° C. and 50% RH conditions for 12 hours. After the leaving to stand, the overlapped recording media were separated from each other, and the degree of pigment transfer to the unprinted recording medium was visually observed. Transferability was evaluated according to the evaluation criteria described below.

The recording medium and unprinted recording medium used were LUMIART GLOSS 90GSM (available from Mondi Corporate) (coat paper 1).

For evaluation of the clear ink of Example 22, the general symbol 2223 in JIS X 0208 (1997) was printed at 128 point with the ink of Example 1 in the manner described above, and then the clear ink of Example 22 was printed under the same conditions as the conditions for printing the ink of Example 1 at the position at which the ink of Example 1 was printed such that the clear ink would overlap the printed portion by Example 1. After this, transferability was evaluated according to the criteria described below under the same conditions as the conditions in the evaluation described above.

[Evaluation Criteria]

A: Almost no pigment transfer to the recording medium was observed.

B: A slight pigment transfer to the recording medium was observed (a transfer to an area less than 10% of the entire recording medium).

C: An apparent pigment transfer to the recording medium was observed (a transfer to an area greater than or equal to 10% of the entire recording medium).

TABLE 9

| | | Fixability | | Transferability | Image | Gloss level |
|---|---|---|---|---|---|---|
| | Ink color | Coat paper 1 | Coat paper 2 | Coat paper 1 | density Coat paper 1 | Coat paper 1 |
| Ex. 1 | Black | AA | AA | A | A | A |
| Ex. 2 | Black | AA | AA | A | A | A |
| Ex. 3 | Black | AA | AA | A | A | A |
| Ex. 4 | Cyan | AA | AA | A | A | A |
| Ex. 5 | Magenta | AA | AA | A | A | A |
| Ex. 6 | Yellow | AA | AA | A | A | A |
| Ex. 7 | Black | A | B | B | B | B |
| Ex. 8 | Black | B | A | B | B | B |
| Ex. 9 | Black | B | B | A | B | B |
| Ex. 10 | Black | A | A | A | B | B |
| Ex. 11 | Black | AA | AA | A | A | B |
| Ex. 12 | Black | A | A | B | B | B |
| Ex. 13 | Black | A | A | A | B | A |
| Ex. 14 | Black | A | A | B | A | A |
| Ex. 15 | Black | A | A | A | A | B |
| Ex. 16 | Black | AA | AA | A | B | B |
| Ex. 17 | Black | AA | AA | A | B | A |
| Ex. 18 | Black | AA | AA | B | A | A |
| Ex. 19 | Black | A | A | A | A | A |
| Ex. 20 | Black | AA | AA | A | B | A |
| Ex. 21 | Black | AA | AA | A | A | A |
| Ex. 22 | Clear ink | AA | AA | A | B | A |
| Comp. Ex. 1 | Black | C | C | C | B | B |
| Comp. Ex. 2 | Black | C | C | C | C | C |
| Comp. Ex. 3 | Black | C | C | C | B | B |
| Comp. Ex. 4 | Black | C | C | C | C | C |
| Comp. Ex. 5 | Cyan | C | C | C | B | C |

TABLE 9-continued

|  | Ink color | Fixability Coat paper 1 | Fixability Coat paper 2 | Transferability Coat paper 1 | Image density Coat paper 1 | Gloss level Coat paper 1 |
|---|---|---|---|---|---|---|
| Comp. Ex. 6 | Magenta | C | B | C | C | C |
| Comp. Ex. 7 | Yellow | B | C | C | C | C |
| Comp. Ex. 8 | Black | C | C | C | B | C |
| Comp. Ex. 9 | Black | C | C | C | C | B |
| Comp. Ex. 10 | Black | C | C | C | B | C |

From the results of Table 9, it can be seen that fixability, transferability, image density, and an image gloss level of any of Examples 1 to 22 over coated paper were higher than these properties of Comparative Examples 1 to 10.

Aspects of the present invention are as follows, for example.

<1> An ink including:
a wax;
a plurality of organic solvents; and
water,
wherein the plurality of organic solvents include a compound having a solubility parameter of 9 or greater but 11 or less and a compound having a saturated vapor pressure at 100° C. of 20 mmHg or greater but 400 mmHg or less.

<2> The ink according to <1>,
wherein the compound having a solubility parameter of 9 or greater but 11 or less is at least one selected from the group consisting of
N,N-dimethyl-β-butoxypropionamide,
N,N-dimethyl-β-ethoxypropionamide, and
3-ethyl-3-hydroxymethyloxetane.

<3> The ink according to <1> or <2>,
wherein the compound having a saturated vapor pressure at 100° C. of 20 mmHg or greater but 400 mmHg or less is at least one selected from the group consisting of propylene glycol monopropylether, propylene glycol monomethylether, and 1,2-propanediol.

<4> The ink according to any one of <1> to <3>,
wherein a ratio by mass (A/B) of a content A (% by mass) of the compound having a solubility parameter of 9 or greater but 11 or less to a content B (% by mass) of the compound having a saturated vapor pressure at 100° C. of 20 mmHg or greater but 400 mmHg or less is 0.5 or greater but 5 or less.

<5> The ink according to any one of <1> to <4>,
wherein the wax is a polyethylene wax.

<6> The ink according to any one of <1> to <5>,
wherein a content of the wax is 0.01% by mass or greater but 10% by mass or less.

<7> The ink according to any one of <1> to <6>,
wherein a content of the wax is 0.02 parts by mass or greater but 0.34 parts by mass or less when a content of the compound having a solubility parameter of 9 or greater but 11 or less is seen to be 1 part by mass.

<8> The ink according to any one of <1> to <7>,
wherein a content of the wax is 0.0025 parts by mass or greater but 1 part by mass or less when a content of the compound having a saturated vapor pressure at 100° C. of 20 mmHg or greater but 400 mmHg or less is seen to be 1 part by mass.

<9> The ink according to any one of <1> to <8>, further including
a surfactant,
wherein the surfactant is a silicone-based surfactant.

<10> The ink according to any one of <1> to <9>,
wherein a viscosity of the ink at 25° C. is 5 mPa·s or greater but 15 mPa·s or less.

<11> The ink according to any one of <1> to <10>, further including
a pigment,
wherein the pigment contains at least one kind of a hydrophilic group over a surface of the pigment and exhibits at least one of water dispersibility and water solubility.

<12> The ink according to <11>,
wherein the pigment is any one of (1) to (3) described below,
(1) a pigment dispersed with a dispersant containing at least one kind of a hydrophilic group,
(2) a pigment coated with a resin containing at least one kind of a hydrophilic group, and
(3) a pigment bound with at least one kind of a hydrophilic group, bound with a group of atoms including at least one kind of a hydrophilic group, or bound with a resin containing at least one kind of a hydrophilic group.

<13> The ink according to any one of <1> to <12>,
wherein a melting point of the wax is 70° C. or higher but 170° C. or lower.

<14> The ink according to any one of <1> to <13>,
wherein a volume average particle diameter of the wax is 20 nm or greater but 150 nm or less.

<15> The ink according to any one of <1> to <14>,
wherein a content of the compound having a solubility parameter of 9 or greater but 11 or less is 1% by mass or greater but 60% by mass or less.

<16> The ink according to any one of <1> to <15>,
wherein a content of the compound having a saturated vapor pressure at 100° C. of 20 mmHg or greater but 400 mmHg or less is 1% by mass or greater but 50% by mass or less.

<17> An ink stored container including:
the ink according to any one of <1> to <16>; and
a container storing the ink.

<18> An inkjet recording apparatus including
the ink stored container according to <17>.

<19> The inkjet recording apparatus according to <17>, further including
an ink flying unit configured to apply a stimulus to the ink according to any one of <1> to <16> to fly the ink and record an image over a recording medium.

<20> An inkjet recording method including
an ink flying step of applying a stimulus to the ink according to any one of
<1> to <16> to fly the ink and record an image over a substrate.

<21> A printed matter including:
a printing medium; and
a printed layer over the printing medium,
wherein the printed layer contains a wax and a plurality of organic solvents, and wherein the plurality of organic solvents include a compound having a solubility parameter of 9 or greater but 11 or less and a compound having a saturated vapor pressure at 100° C. of 20 mmHg or greater but 400 mmHg or less.

<22> A recorded matter including:
a recording medium; and
an image recorded over the recording medium with the ink according to any one of <1> to <16>.

The ink according to any one of <1> to <16>, the ink stored container according to <17>, the inkjet recording apparatus according to <18> or <19>, the inkjet recording method according to <20>, the printed matter according to <21>, and the recorded matter according to <22> can solve the various problems in the related art and achieve the object of the present invention.

What is claimed is:

1. An ink comprising:
a polyethylene wax having nonvolatile content of 45% by mass or more;
a plurality of organic solvents;
a silicone-based surfactant;
water, and
a pigment,
wherein the plurality of organic solvents comprise a compound having a solubility parameter of 9 or greater but 11 or less and a compound having a saturated vapor pressure at 100° C. of 20 mmHg or greater but 400 mmHg or less; and
wherein a ratio by mass (A/B) of a content A (% by mass) of the compound having a solubility parameter of 9 or greater but 11 or less to a content B (% by mass) of the compound having a saturated vapor pressure at 100° C. of 20 mmHg or greater but 400 mmHg or less is 1.8 or greater but 5 or less.

2. The ink according to claim 1, wherein the compound having a solubility parameter of 9 or greater but 11 or less comprises at least one selected from the group consisting of N,N-dimethyl-β-butoxypropionamide, N,N-dimethyl-β-ethoxypropionamide, and 3-ethyl-3-hydroxymethyloxetane.

3. The ink according to claim 1, wherein the compound having a saturated vapor pressure at 100° C. of 20 mmHg or greater but 400 mmHg or less comprises at least one selected from the group consisting of propylene glycol monopropylether, propylene glycol monomethylether, and 1,2-propanediol.

4. The ink according to claim 1, wherein a content of the wax is 0.01% by mass or greater but 10% by mass or less.

5. The ink according to claim 1, wherein a content of the wax is 0.02 parts by mass or greater but 0.34 parts by mass or less when a content of the compound having a solubility parameter of 9 or greater but 11 or less is seen to be 1 part by mass.

6. The ink according to claim 1, wherein a content of the wax is 0.0025 parts by mass or greater but 1 part by mass or less when a content of the compound having a saturated vapor pressure at 100° C. of 20 mmHg or greater but 400 mmHg or less is seen to be 1 part by mass.

7. The ink according to claim 1, wherein a viscosity of the ink at 25° C. is 5.9 mPa·s or greater but 8.0 mPa·s or less.

8. The ink according to claim 1, wherein the pigment comprises at least one kind of a hydrophilic group over a surface of the pigment and exhibits at least one of water dispersibility and water solubility.

9. The ink according to claim 1, wherein the pigment is any one of (1) to (3) described below,
(1) a pigment dispersed with a dispersant that comprises at least one kind of a hydrophilic group,
(2) a pigment coated with a resin that comprises at least one kind of a hydrophilic group, and
(3) a pigment bound with at least one kind of a hydrophilic group, bound with a group of atoms that comprise at least one kind of a hydrophilic group, or bound with a resin that comprises at least one kind of a hydrophilic group.

10. An ink stored container comprising:
an ink; and
a container storing the ink,
wherein the ink comprises:
a polyethylene wax having nonvolatile content of 45% by mass or more;
a plurality of organic solvents;
a silicone-based surfactant;
water, and
a pigment,
wherein the plurality of organic solvents comprise a compound having a solubility parameter of 9 or greater but 11 or less and a compound having a saturated vapor pressure at 100° C. of 20 mmHg or greater but 400 mmHg or less; and
wherein a ratio by mass (A/B) of a content A (% by mass) of the compound having a solubility parameter of 9 or greater but 11 or less to a content B by mass) of the compound having a saturated vapor pressure at 100° C. of 20 mmHg or greater but 400 mmHg or less is 1.8 or greater but 5 or less.

11. An inkjet recording apparatus comprising the ink stored container according to claim 10.

12. A printed matter comprising:
a printing medium; and
a printed layer over the printing medium,
wherein the printed layer comprises a polyethylene wax having nonvolatile content of 45% by mass or more, a pigment, a silicone-based surfactant, and a plurality of organic solvents, and
wherein the plurality of organic solvents comprise a compound having a solubility parameter of 9 or greater but 11 or less and a compound having a saturated vapor pressure at 100° C. of 20 mmHg or greater but 400 mmHg or less; and
wherein a ratio by mass (A/B) of a content A (% by mass) of the compound having a solubility parameter of 9 or greater but 11 or less to a content B (% by mass) of the compound having a saturated vapor pressure at 100° C. of 20 mmHg or greater but 400 mmHg or less is 1.8 or greater but 5 or less.

* * * * *